United States Patent [19]
Takahashi et al.

[11] 4,330,519
[45] * May 18, 1982

[54] NOVEL AMORPHOUS SILICA

[75] Inventors: Akira Takahashi; Toru Takikawa, both of Gifu, Japan

[73] Assignee: Kabushiki Kaisha Osaka Packing Seizosho, Osaka, Japan

[*] Notice: The portion of the term of this patent subsequent to Oct. 28, 1997, has been disclaimed.

[21] Appl. No.: 171,163

[22] Filed: Jul. 22, 1980

Related U.S. Application Data

[60] Division of Ser. No. 920,204, Jun. 29, 1978, Pat. No. 4,230,765, which is a continuation of Ser. No. 670,543, Mar. 25, 1976, abandoned.

[30] Foreign Application Priority Data

Mar. 25, 1975 [JP] Japan .................................. 50-36298
Mar. 25, 1975 [JP] Japan .................................. 50-36299
Mar. 25, 1975 [JP] Japan .................................. 50-36300

[51] Int. Cl.$^3$ .............................................. C01B 33/12
[52] U.S. Cl. ..................................... 423/335; 252/449; 252/450
[58] Field of Search .................. 423/325, 335, 339; 106/288 B; 428/283, 331, 346; 252/449, 450

[56] References Cited

U.S. PATENT DOCUMENTS

| | | | |
|---|---|---|---|
| 1,751,955 | 3/1930 | Stuewener | 423/339 |
| 2,114,123 | 4/1938 | Heuser | 106/288 B |
| 3,250,594 | 5/1966 | Burke et al. | 106/288 B |
| 3,307,906 | 3/1967 | Burke | 106/288 B |
| 3,328,125 | 6/1967 | Mays et al. | 423/325 |
| 3,372,046 | 3/1968 | Burke | 106/288 B |
| 3,503,707 | 3/1970 | Burke | 106/288 B |
| 3,558,524 | 1/1971 | Flanigen | 252/450 |
| 3,719,741 | 3/1973 | Burke | 106/288 B |
| 3,849,344 | 11/1974 | McMurty et al. | 423/325 |
| 3,855,394 | 12/1974 | Burke | 106/288 B |
| 3,969,567 | 7/1976 | Occleshaw | 106/98 |
| 4,230,765 | 10/1980 | Takahaski et al. | 423/339 X |

FOREIGN PATENT DOCUMENTS 2008108 9/1970 Fed. Rep. of Germany .

Primary Examiner—Jack Cooper
Attorney, Agent, or Firm—Armstrong, Nikaido, Marmelstein & Kubovcik

[57] ABSTRACT

Amorphous silicas having a crystalline appearance, at least two surfaces in symmetric relation, a length of about 1 to about 500μ and a thickness of about 50 Å to about 1μ, the length being at least about 10 times the thickness, the amorphous silicas being in the form of primary particles, secondary particles, aqueous dispersions of the particles and shaped bodies.

3 Claims, 20 Drawing Figures

NOVEL AMORPHOUS SILICA

This is a divisional of application Ser. No. 920,204, filed June 29, 1978, now U.S. Pat. No. 4,230,765, which is a continuation of application Ser. No. 670,543, filed Mar. 25, 1976 and now abandoned.

This invention relates to novel amorphous silicas having a crystalline appearance, products thereof and methods of preparing the silicas and their products.

Silica gel which is known as a representative example of amorphous silicas is mainly produced by neutralizing an aqueous solution of sodium silicate with an acid such as hydrochloric acid or sulfuric acid to form a precipitate, and washing and drying the precipitate. When desired, the silica gel obtained is heated at reduced pressure for activation. Depending on the method of production, silica gel is obtained in an indefinite or spherical shape. Furthermore when required, silica gel is shaped to tablets and the like using a binder. Silica gel is used for example as a drying agent, adsorbent, dehydrant, deodorant, catalyst carrier, etc. because of its hygroscopicity and large specific surface area.

However, silica gel readily adsorbs water upon contact therewith and collapses. It is therefore impossible or difficult to use silica gel in a system in which it is directly exposed to water. Generally silica gel has an average pore diameter of 20 to 220 Å. Silica gel with a relatively small average pore diameter usually has a great bulk density of about 0.7 g/cm$^3$, whereas conversely one possessing a bulk density of about 0.2 g/cm$^3$ invariably has a large average pore diameter of about 180 to about 220 Å in general. Accordingly, the silica gel with an averge pore diameter of the order of 20 to 40 Å suitable for use as an adsorbent for gases and water has a great bulk density and an inherently limited adsorbing capacity per unit weight. Although the capacity to adsorb oils increases with decreasing bulk density and increasing specific surface area, silica gel having a large specific surface area also has a high bulk density and therefore invariably possesses an insufficient or no oil adsorbing capacity.

Particles of silica gel in themselves are not shapable without the use of a binder; in fact it is impossible to obtain a strong shaped body without using any binder. In addition, silica gel has not been used for the production of heat-resistant glass, refractory heat insulator, heat-resistant filter, etc.

The primary object of this invention is to provide a novel and useful amorphous silica, products thereof and methods of preparing the silica and its products.

Another object of this invention is to provide a novel amorphous silica which possesses various useful properties and which are therefore usable in place of known silica gel and also applicable to uses for which the known silica gel is unserviceable.

Another object of this invention is to provide a novel amorphous silica which has a high capacity to adsorb water but outstanding resistance to water and remains uncollapsible despite the adsorption of water and which is therefore usable in a system in which it is directly exposed to water.

Another object of this invention is to provide a novel amorphous silica which has a small average pore diameter of about 20 to about 40 Å and also a small bulk density although none of silica gels heretofore known do not possess both the characteristics and which is suitable for the adsorption of gases and water.

Another object of this invention is to provide a novel amorphous silica having a small bulk density and a large specific surface area and accordingly a high oil adsorbing capacity.

Another object of this invention is to provide an amorphous silica readily dispersible in water to give an aqueous slurry from which a lightweight and strong shaped body can be obtained by shaping and drying without using any binder and also to provide the aqueous slurry.

Another object of this invention is to provide a lightweight shaped body of amorphous silica which has high mechanical strength and acid resistance and which is therefore usable as a heat insulator, filter medium, catalyst carrier, etc.

Another object of this invention is to provide a novel amorphous silica suitable as a material for the production of heat-resistant glass.

Another object of this invention is to provide a novel amorphous silica which readily permits the passage of water, therefore can be drained easily and is uncollapsible when in contact with water, the amorphous silica thus being serviceable for various uses wherein there characteristics are advantageously utilized.

Another object of this invention is to provide methods of preparing the novel amorphous silicas having the foregoing excellent properties and products thereof.

Another object of this invention is to provide a novel composite material composed of the novel amorphous silica and extremely fine particles of calcium carbonate attached to the silica.

Another object of this invention is to provide a method of preparing a novel composite material of amorphous silica and calcium carbonate which is useful as a filler and reinforcing agent and also to provide a method of preparing products from the composite material.

These and other features of this invention will become apparent from the following description.

Basically, the amorphous silicas of this invention are in the form of primary particles and characterized in that the particles having a crystalline appearance and has at least two surfaces in symmetric relation, a length of about 1 to about 500$\mu$ and a thickness of about 50 Å to about 1$\mu$ the length being at least about 10 times the thickness. The amorphous silicas of this invention include, in addition to those having the form of primary particles described above, those in the form of secondary particles and those in the form of a shaped body.

The term "Opsil" as used in the specification refers to the amorphous silica of this invention. Thus by the term "Opsil-I" is meant an amorphous silica of this invention having the form of primary particles, and by the term "Opsil-II" is meant an amorphous silica of this invention having the form of secondary particles.

Opsil-I of this invention is amorphous silica of high purity and therefore does not display any X-ray diffraction phenomenon and, when dehydrated by ignition and then chemically analyzed, is found to contain at least 98% by weight of SiO$_2$. Observation under an electron microscope has revealed that the primary particle, the basic form of Opsils, has a crystalline appearance and at least two surfaces in symmetric relation, although it is amorphous.

The crystalline appearance, the most distinct feature of Opsils of this invention, is attributable to the fact that they are derived from silicate crystals by the conversion of the silicate crystals into amorphous silica which retains the original configuration of the crystals. Accordingly, the crystalline appearance and size of the particles of Opsil-I are substantially in conformity with the appearance and size of the silicate crystals from which they are derived, and Opsil-I particles have varying configurations and sizes in corresponding relation to the original crystals. For example, the lath-like crystals of wollastonite, xonotlite, foshagite or like calcium silicate are converted into the particles of Opsil-I having a lath-like configuration. The particles of Opsil-I have a plate-like cofiguration if they are derived from the plate-like crystals of tobermorite, gyrolite, α-dicalcium silicate hydrate (α-C$_2$SH) or like calcium silicate. The particles of Opsil-I derived from the foil-like crystals of calcium silicate such as CSH$_n$ have a foil-like configuration. The sizes of these lath-like, plate-like and foil-like Opsil-I particles range from about 1 to about 500μ, preferably about 1 to about 300μ, in length and from about 50 Å to about 1μ, preferably about 100 Å to about 1μ, in thickness, the length being at least about 10 times, preferably about 10 to about 5000 times, the thickness. The lath-like particles of Opsil-I derived from primary particles of xonotlite crystals have the configuration of the primary particles and are about 1 to about 50μ in length, about 100 Å to about 0.5μ in thickness and about 100 Å to about 2μ in width, the length being about 10 to about 5,000 times the thickness. The plate-like particles of Opsil-I derived from primary particles of tobermorite crystal have the configuration of the primary particles and are about 1 to about 50μ in length, about 100 Å to about 0.5μ in thickness and about 0.2 to about 20μ in width, the length being about 10 to about 5,000 times the thickness. The lath-like particles of Opsil-I derived from primary particles of wollastonite crystals have the configuration of the primary particles and are about 1 to about 500μ in length, about 100 Å to about 1μ in thickness and about 100 Å to about 5μ in width, the length being about 10 to about 5,000 times the thickness. The foil-like particles of Opsil-I derived from primary particles of CSH$_n$ crystals have the configuration of the primary particles and are about 1 to about 20μ in length, about 50 Å to about 500 Å in thickness and about 100 Å to about 20μ in width, the length being about 50 to about 5,000 times the thickness. The plate-like particles of Opsil-I derived from primary particles of gyrolite crystals have the configuration of the primary particles and are about 1 to about 50μ in length, about 100 Å to about 0.5μ in thickness and about 1 to about 20μ in width, the length being about 10 to about 5,000 times the thickness. The plate-like particles of Opsil-I derived from primary particles of α-dicalcium silicate hydrate crystals have the configuration of the primary particles and are about 1 to about 500μ in length, about 500 Å to about 1μ in thickness and about 1 to about 50μ in width, the length being about 10 to about 5,000 times the thickness.

Table 1 gives the chemical composition of Opsil-I, which is subjected to ignition dehydration and thereafter to elementary analysis, and Table 2 shown the physical properties of Opsil-I in comparison with those of silica gel.

TABLE 1

| Ig. loss | 4–7 wt. % |
|---|---|
| SiO$_2$ | >98.0 wt. % |
| Al$_2$O$_3$ | < 1.0 wt. % |
| Fe$_2$O$_3$ | < 0.01 wt. % |

TABLE 1-continued

| Ig. loss | 4–7 wt. % |
|---|---|
| CaO | < 0.02 wt. % |

TABLE 2

| | Opsil-I | Silica gel RD$^{(1)}$ | ID$^{(2)}$ | LD$^{(3)}$ |
|---|---|---|---|---|
| Bulk density (g/cm$^3$) | 0.04–0.03 | 0.67–0.75 | 0.35–0.40 | 0.12–0.17 |
| True specific gravity (g/cm$^3$) | 1.9–2.2 | 2.2 | 2.2 | |
| Specific surface area (m$^2$/g) | 250–600 | 750–800 | 300–350 | 100–200 |
| Pore volume (ml/g) | 0.1–0.5 | 0.37–0.40 | 0.9–1.1 | 1.4–2.0 |
| Av. pore diameter (Å) | 20–40 22–26 | 120–160 | 180–220 | |
| Particle size (μ) | 1–500 | 1,000–5,000 | 1,000–5,000 | 1–5 |
| Oil adsorption (cc/100 g) | 300–900 | 0 | 0 | <300 |
| Hygroscopicity (%) | 220 | 45 | 110 | 150 |
| Water resistance | No change | Collapse | Collapse | — |
| Thermal conductivity (Kcal/m.h.deg.) | 0.03 | — | — | — |
| pH | 6–7 | — | — | — |

Note:
$^{(1)}$RD stands for regular density.
$^{(2)}$ID stands for intermediate density.
$^{(3)}$LD stands for low density.
(Literature: Encyclopedia of Chemical Technology 18, (1969) p61–67)

The characteristic values in Table 2 are determined by the following methods.

Bulk density: A 10 g quantity of particles are placed in a cylinder 5 cm$^2$ in cross sectional area and subjected to a load of 250 g by a 50 g/cm$^2$ capacity piston-cylinder device. The volume of the compressed mass is then measured. Bulk density is given by $$\text{Bulk density} = \frac{10 \text{ (g)}}{\text{Volume (cm}^3\text{)}}$$

True specific gravity: Measured by air comparison pycnometer Model 930, Beckmann Co., with air replaced by He gas.

Average pore diameter: By BET nitrogen absorption method.

Specific surface area: Same as above.

Pore volume: Same as above.

Particle size: Determined under optical and electron microscopes.

Oil adsorption: Dioctyl phthalate (C$_6$H$_4$(COOC$_8$H$_{17}$)$_2$) is added dropwise to 100 g of particles to cause the particles to adsorb the phthalate, and the amount of the phthalate is measured when the mass of the particles starts to become markedly viscous.

Hygroscopicity: Particles are placed in a container at R.H. 100% and maintained at 25° C., allowing the particles to adsorb moisture until an equilibrium is established. Hygroscopicity is expressed in terms of the weight by % of the moisture adsorbed based on the particles. The valves listed are obtained using Opsil-I having a bulk density of 0.1 g/cm$^3$, and silica gels with a bulk density of 0.7 g/cm$^3$ for RD type, a bulk density of 0.4 g/cm³ for ID type and a bulk density of 0.15 g/cm³ for LD type.

Table 2 shows that Opsil-I has a small average pore diameter and a large specific surface area despite its small bulk density, does not collapse then immersed in water because of its good resistance to water and is highly oil-adsorbent, remarkably hygroscopic and extremely low in thermal conductivity. Further, Opsil has an approximately neutral pH of 6 to 7 and high resistance to chemicals and will not be decomposed with hydrochloric acid and the like acids. These properties are very advantageous over the properties of calcium silicate crystals from which they are derived; the crystals have a high pH of 10 to 11, are decomposable with an acid such as hydrochloric acid and therefore find limited uses.

Moreover, Opsil-I is easily dispersible in water to form an aqueous slurry thereof and has a peculiar shapability that the slurry gives, when shaped and dried, a light weight shaped body composed of Opsil-I randomly three-dimensionally interlocked with one another integrally into the body and having a high mechanical strength. The aqueous slurry to be shaped may preferably have a water to solid ratio of 4–50:1 by weight. When desired, the slurry may incorporate therein a fibrous reinforcing material such as asbestos, glass fibers, rock wool, synthetic fibers, natural fibers, pulp, carbon fibers, stainless steel fiber, alumina sol, colloidal silica sol, clay, cement, coloring agent, filler and various other additives. The shaped body is usable variously for example as a heat insulating material, filtration medium, catalyst carrier, etc.

Because of the unique particulate shape and properties described above, Opsil-I is serviceable as a substitute for silica gel in uses for which silica gel is usually employed and is also serviceable in other uses to which silica gel is not applicable. For example, Opsil-I is useful as a filler, drying agent, adsorbent, deodorant, filter medium, heat-resistant filter, additive for adhesives, heat-resistant agent, delustering agent for paper making, emulsifier for cosmetics, abrasion-resistant agent, heat insulator, viscosity imparting agent, pigment, tooth powder, carrier for agricultural chemicals, carrier for pharmaceuticals, catalyst, catalyst carrier, material for heat-resistant glass, absorbent for gas chromatography, excipient, anticaking agent, fixing agent for volatile substances, molecular sieve, shaped body, etc.

Opsil-II is in the form of substantially globular secondary particles of the amorphous silica of this invention. Each of the secondary particles is composed of numerous primary particles of amorphous silica randomly three-dimensionally interlocked with one another and voids interspersed therebetween and has a diameter of about 10 to about 150μ, preferably about 10 to about 80μ, the primary particle having a crystalline appearance, at least two surfaces in symmetric relation, a length of about 1 to about 500μ, preferably about 1 to about 300μ, and a thickness of about 50 Å to about 1μ, preferably about 100 Å to about 1μ, the length being at least about 10 times, preferably about 10 to about 5,000 times, the thickness. Opsil-II is usually has a porosity of at least about 75%, preferably about 80 to about 98%.

Since Opsil-II is composed of Opsil-I described above, it has the foregoing properties of Opsil-I and finds the same uses as Opsil-I.

Moreover, Opsil-II is readily dispersible in water to form an aqueous slurry and has the peculiar shapability that the slurry gives a lightweight shaped body having high mechanical strength, when shaped and dried. Generally, the shaped body obtained from Opsil-II has higher mechanical strength than that obtained from Opsil-I having the same bulk densith therewith. More specifically, when the aqueous slurry of Opsil-II is subjected to pressure for shaping, the particles are compressed in the direction of pressure applied in the shaping step. Namely, the particles of Opsil-II in the present shaped body are compressed more or less in at least one direction due to the pressure applied in the shaping step. The compressed particles are interlocked with one another and shaped to an integral body in this state when dried. The bulk density of the shaped body, which is controllable as desired by altering the shaping pressure, can vary over a wide range. Preferably, the bulk density is in the range of about 0.1 g/cm³ to about 1.0 g/cm³. The shaped body is usable variously for example as a heat insulating material, filtration medium, catalyst carrier, etc.

Generally, the aqueous slurry of Opsil-II to be shaped may preferably have a water to solids ratio of 8–50:1 by weight. When desired, the aqueous slurry may incorporate therein a fibrous reinforcing material such as asbestos, glass fiber, rock wool, synthetic fibers, natural fibers, pulp, carbon fibers or stainless steel fibers, alumina sol, colloidal silica sol, clay, cement, coloring agent, filler and various other additives. The additives afford useful properties to the shaped body.

Table 3 gives the properties of Opsil-II.

TABLE 3

| | |
|---|---|
| Bulk density (g/cm³) | 0.05–0.5 |
| Specific surface area (m²/g) | 250–600 |
| Specific surface area (m²/g) after heating at 400° C. | 200–550 |
| Porosity (%) | preferably at least 75 |
| Oil adsorption (cc/100 g) | 500–1200 |
| pH | 6–7 |
| Heat resistance | Secondary particles retain shape at 950° C. |

The properties listed above are determined by the same methods as in Table 2, wherein the porosity is given by $$\text{Porosity (\%)} = \left(1 - \frac{\text{Apparent specific gravity of Opsil-II}}{\text{True specific gravity of Opsil-II}}\right) \times 100$$

The heat resistance is determined with the unaided eyes.

This invention further provides novel shaped bodies of amorphous silica which include a shaped body composed of Opsil-I (hereinafter referred to as "Opsil-IS") and a shaped body composed of Opsil-II (hereinafter referred to as "Opsil-IIS"). Opsil-IS is a shaped body which is integrally formed from the particles of Opsil-I randomly three-dimensionally interlocked with one another. That is to say, Opsil-IS comprises primary particles of amorphous silica randomly three-dimensionally interlocked with one another integrally into the body and voids interspersed therebetween, each of the primary paticles having a crystalline appearance, at least two surfaces in symmetric relation, a length of about 1 to about 500μ, preferably 1 to about 300μ, and a thickness of about 50 Å to about 1μ, preferably about 100 Å to about 1μ, the length being at least about 10 times, preferably about 10 to about 5,000 times, the thickness. The shaped body usually has a porosity of at least about 50%, preferably about 60 to about 95%.

Opsil-IIS is a shaped body in which the particles of Opsil-II are interlocked with one another into the integral body. Namely, Opsil-IIS comprises secondary particles of amorphous silica compressed in at least one direction and interlocked with one another integrally into the body and voids interspersed therebetween, the secondary particle being composed of numerous primary particles of amorphous silica randomly three-dimensionally interlocked with one another, each of the primary particles having a crystalline appearance, at least two surfaces in symmetric relation, a length of about 1 to 500$\mu$, preferably about 1 to about 300$\mu$, and a thickness of about 50 Å to about 1$\mu$, preferably about 100 Å to about 1$\mu$, the length being at least 10 times, preferably about 10 to about 5,000 times, the thickness. Opsil-IIS usually has a porosity of at least about 50%, preferably about 60% to about 97%.

Both Opsil-IS and Opsil-IIS have a large porosity, are lightweight and have high mechanical strength. More specifically, they have a low bulk density of about 0.1 to about 0.4 g/cm$^3$ and high bending strength of about 3 to 30 kg/cm$^2$. The bulk density can be increased. The mechanical strength of the shaped body increases with increasing bulk density. For example, shaped bodies with a bulk density of 0.4 g/cm$^3$ to 1.0 g/cm$^3$ possess high bonding strength of 20 to 100 kg/cm$^3$. The lightweight and mechanically strong characteristics of such shaped bodies are attributable to the fact that the component particles of Opsil-I and/or Opsil-II are firmly joined to one another and have a large porosity. The porosity increases with decreasing bulk density.

These shaped bodies, i.e. Opsil-IS and Opsil-IIS, may be composed of Opsil-I and Opsil-II or may further contain any of various fibrous reinforcing materials such as glass fibers, ceramic fibers, asbestos, rock wool, synthetic fibers (polyamide fiber, polyvinylalchol fiber, etc.), natural fibers, pulp, stainless steel fibers, metal fibers and carbon fibers, clay, cement, coloring agent, filler and like additives. The shaped bodies may incorporate therein iron reinforcing rods, wire nets, fabrics, etc.

Because of the properties described above, Opsil-IS and Opsil-IIS are useful as heat insulators, refractories, filter media, catalyst carriers, etc.

Opsils of the present invention can be prepared from various natural or synthetic silicate crystals having the network or chain structure of SiO$_4$ tetrahedrons. The method for preparing Opsils of the invention is not limitative and optional methods are applicable, as far as the present Opsils are obtained. According to one of the preferred methods, Opsils are prepared from calcium silicate crystals by contacting the crystals with carbon dioxide gas in the presence of water to convert the calcium silicate to amorphous silica and extremely fine particles of calcium carbonate, treating the resulting product with an acid to decompose the calcium carbonate into carbon dioxide and calcium salt and separating the amorphous silica from the calcium salt.

The most distinct feature of this method is that calcium silicate can be converted to amorphous silica without entailing a substantial change in the configuration of the component crystals of calcium silicate. Consequently, the amorphous silica thus obtained, namely Opsil, substantially retains the original configuration of calcium silicate crystals and therefore possesses the foregoing various useful properties as distinct from the properties of conventional amorphous silica.

The calcium silicate crystals usable as the starting crystals include crystals of wollastonite-type calcium silicates such as wallastonite, xonotlite, foshagite, hillebrandite, rohsenhanite, etc., crystals as tobermorite-type calcium silicates such as tobermorite, crystals of gyrolite-type calcium silicates such as gyrolite, truscottite, reyerite, etc., crystals of $\gamma$-dicalcium silicates hydrate such as calcio-condrodite, kilchoanite, afwillite, etc., crystals of $\alpha$-dicalcium silicate hydrate, tricalcium silicate hydrate, CSH$_n$, CSH(I), CSH(II), etc.

These crystals are used as a starting material in the form of primary particles, secondary particles or a shaped body. Since Opsils assume the original configuration of the crystals without any substantial change, the forms of the starting crystals are retained in Opsils free of any substantial change. Put in detail, primary particles of crystalline calcium silicate (having at least two surfaces in symmetric relation, a length of about 1 to about 500$\mu$ and a thickness of about 50 Å to about 1$\mu$, the length being at least about 10 times the thickness) give Opsil-I in which the configuration of the crystalline particles remain intact. Secondary particles of crystalline calcium silicate, each composed of numerous primary particles of silicate randomly three-dimensionally interlocked together into a substantially globular form of about 10 to about 150$\mu$ in diameter and voids interspersed therebetween, afford Opsil-II substantially retaining the same form or structure. Secondary particles of crystalline calcium silicate having a porosity of about 50% or more are preferably used to obtain Opsil-II having a porosity of about 75% or more. In this case the secondary particles of crystalline calcium silicate having a porosity of at least about 60% are most preferable. Further Opsil-IS is obtained from a shaped body of calcium silicate crystals which is integrally formed from primary particles of crystalline calcium silicate randomly three-dimensionally interlocked with one another and has voids interspersed therebetween. Opsil-IS having a porosity of about 50% or more can be prepared from a shaped body of calcium silicate crystals having a porosity of about 40% or more, preferably at least about 50%. Opsil-IS can also be prepared from aqueous slurry of Opsil-I as disclosed before. In this case Opsil-IS having various porosities can be obtained by varying pressures applied in shaping procedures. Furthermore, Opsil-IIS is prepared from a shaped body of calcium silicate crystals wherein the above-mentioned globular secondary particles of crystalline calcium silicate are integrally interlocked with one another with voids interspersed therebetween. The shaped body composed of the globular secondary particles of calcium silicate crystals and having a porosity of about 55% or more, preferably at least about 60%, is used to obtain Opsil-IIS having a porosity of about 80% or more. Opsil-IIS can also be prepared from Opsil-II by dewatering and shaping the aqueous slurry of Opsil-II with pressure and drying the shaped mass. In this case Opsil-IIS having a porosity of about 50% or more is obtainable by varying the pressure for shaping.

The calcium silicate crystals in the versatile forms described and useful for the production of Opsils of this invention are known and can be prepared by known methods. For example, globular secondary particles of crystalline calcium silicate can be obtained by a method developed by the present applicant and described in Japanese Patent Publication No. 25771/1970. According to this method, an aqueous slurry of globular secondary particles is prepared by dispersing a siliceous material and a lime material in water, along with a desired reinforcing material or like additive, if desired, to obtain a starting slurry and subjecting the slurry to hydrothermal reaction with stirring to effect crystallization. The shaped body of calcium silicate crystals composed of the globular secondary particles is prepared by a further method described in the Japanese Patent Publication No. 25771/1970. With this method, a reinforcing material or like additive is added, when desired, to the aqueous slurry of the globular secondary particles obtained as above, and the resulting slurry is shaped with dewatering and dried, whereby a shaped body of calcium silicate crystals is obtained in which the secondary particles are compressed in at least one direction and interlocked with one another into the integral body. The shaped body composed of numerous primary particles of crystalline calcium silicate randomly three-dimensionally interlocked together for the production of Opsil-IS can be prepared by the method disclosed in Japanese Patent Publication No. 4040/1955, Japanese Patent Publication No. 1953/1966, U.S. Pat. No. 2,665,996 and U.S. Pat. No. 2,699,097, namely by gelling a starting slurry containing a siliceous material and a lime material dispersed in water, placing the gel in a mold or shaping by dewatering, and subjecting the shaped mass to hydrothermal reaction for crystallization and hardening. The primary particles of crystalline calcium silicate can be readily prepared also by finely dividing the globular secondary particles or the shaped body of calcium silicate crystals.

Useful siliceous materials for the preparation of the calcium silicate crystals are natural amorphous siliceous materials, siliceous sand, synthetic siliceous materials, diatomaceous earth, clay, slug, terra alba, fly ash, pearlite, white carbon, silicon dust and the like which predominantly comprises $SiO_2$. These can be used singly, or two or more of them are usable in admixture. Examples of lime materials are quick lime, slaked lime, carbide residue, cement, etc. which predominantly comprises CaO. These materials are also usable singly, or two or more of them are usable in admixture. Generally, the materials may be used in a CaO to $SiO_2$ mole ratio approximately of 0.5–3.5:1.

When desired, the starting materials may be used conjointly with glass fibers, ceramics fibers, asbestos, rock wool, synthetic fibers, natural fibers, pulp, stainless steel fibers, carbon fibers or like fibrous reinforcing material, and coloring agent or like additive which may be added to the materials.

The amount of water to be used, which is variable over a wide range, may generally be about 3.5 to about 30 times the total weight of the solids. The reaction is preferably conducted in an autoclave at a saturation temperature under particular water vapor pressure. The reaction temperature is usually higher than 100° C., preferably higher than 150° C., and the reaction pressure is the saturated vapor pressure corresponding to the temperature applied. The reaction is usually completed in about 0.5 to about 20 hours. The calcium silicate crystals are obtained with varying degrees of crystallization depending on the CaO to $SiO_2$ mole ratio, reaction pressure, temperature and time referred to above. The calcium silicate crystals include, for example, xonotlite, tobermorite, foshagite, gryolite, α-dicalcium silicate hydrate, $CSH_n$ and like crystals. The xonotlite crystals, when further baked at about 1,000° C., can be converted to wollastonite crystals without resulting in any change in the shape of the crystals (Japanese Patent Publication No. 29493/1975).

According to this invention, the calcium silicate crystals in the form of primary particles, globular secondary particles and shaped bodies are contacted with carbon dioxide in the presence of water for forced carbonation. The carbonation is effected by contacting the calcium silicate crystals with the carbon dioxide in the presence of water. Preferably, the carbonation is effected, for example, by placing the calcium silicate crystals of the aforesaid form in a suitable closed container and introducing carbon dioxide gas into the container at a high humidity or under wet atmosphere, or by introducing carbon dioxide gas into water or carbonated water in which much calcium silicate crystals have been immersed. When the calcium silicate crystals are prepared in the form of an aqueous slurry of secondary particles, carbon dioxide gas may of course be introduced directly into the slurry. Insofar as carbon dioxide gas is introduced into the reaction system, the carbonation will proceed satisfactorily at room temperature under atmospheric pressure. However, it is preferable to effect the carbonation at increased pressure of up to 10 kg/cm² gage, whereby the reaction can be completed within a shorter time at an accelerated velocity. The carbon dioxide is used in a stoichiometric amount or in excess. When the calcium silicate crystals are carbonated as immersed in water, the carbonation velocity can be increased by stirring the reaction system. The preferable ratio of water to calcium silicate crystals is in the range of 1–50:1, most preferably 1–25 to 1, by weight. The velocity of carbonation varies to some extent with the degree of crystallization of the calcium silicate used as the starting material. However, when carbonating xonotlite crystals the carbonation of which proceeds at the lowest velocity, the reaction will be completed in about 4 to 10 hours by using water in an amount of about 2 to about 6 times the dry weight of the crystals. Further when the amount of water is 5 times as much, the reaction will be completed usually in about one hour at reaction pressure of 2 kg/cm² gauge, or in as short a period of time as about 30 minutes at reaction pressure of 3 kg/cm² gauge.

Depending on the particular type of calcium silicate crystals used and the degree of crystallization thereof, the carbonation proceeds as represented by the following equations.

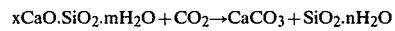

$$xCaO.SiO_2.mH_2O + CO_2 \rightarrow CaCO_3 + SiO_2.nH_2O$$

wherein x is a number of 0.5 to 3.5.

In the step of carbonation calcium silicate crystals are converted into composite particles of amorphous silicate and calcium carbonate without any substantial change of the configuration of calcium silicate crystals. The resulting calcium carbonate particles are in the form of extremely fine particles having a particle size of less than about 2μ and found to be attached to amorphous silica particles through a chemical or physical action. For example, when the composite primary particles of amorphous silica and calcium carbonate resulting from the carbonation are dispersed in water to a concentration of 5 wt. %, stirred for 20 minutes and thereafter allowed to stand in an attempt to separate the particles into the two components by settling utilizing the difference in specific gravity, they are in no way separable and found to be firmly joined together through a chemical or physical action.

Since the step of carbonation produces no change in the configuration of calcium silicate crystals, the primary particles, secondary particles and shaped bodies of amorphous silica-calcium carbonate composite materials can respectively be obtained by the carbonation from primary particles, secondary particles and shaped bodies of calcium silicate crystals without any change in configurations thereof.

The composite material of amorphous silica and calcium carbonate in the form of a primary particle comprises an amorphous silica particle and an extremely fine particle of calcium carbonate attached to the amorphous silica particle, the amorphous silica particle having a crystalline appearance, at least two surfaces in symmetric relation, a length of about 1 to about 500μ and a thickness of about 50 Å to about 1μ, the length being at least about 10 times the thickness. The composite material of amorphous silica and calcium carbonate in the form of a substantially globular secondary particle has a diameter of about 10 to about 150μ and is composed of numerous amorphous silica-calcium carbonate composite primary particles and voids interspersed therebetween, each of the constituent composite particles comprising an amorphous silica particle in the form of a primary particle and an extremely fine particle of calcium carbonate attached to the amorphous silica particle, the amorphous silica particle having a crystalline appearance, at least two surfaces in symmetric relation, a length of about 1 to about 500μ and a thickness of about 50 Å to about 1μ, the length being at least about 10 times the thickness. The composite materials of amorphous silica and calcium carbonate in the form of shaped body include a shaped body composed of numerous composite primary particles and one composed of numerous composite secondary particles. The former shaped body comprises amorphous silica-calcium carbonate composite primary particles randomly three-dimensionally interlocked with one another integrally into the body with voids interspersed therebetween, each of the primary particles comprising an amorphous silica particle in the form of a primary particle and an extremely fine particle of calcium carbonate attached to the amorphous silica particle, the amorphous silica particle having a crystalline appearance, at least two surfaces in symmetric relation, a length of about 1 to about 500μ and a thickness of about 50 Å to about 1μ, the length being at least about 10 times the thickness. The latter shaped body comprises numerous amorphous silica-calcium carbonate composite secondary particles being compressed to at least one direction and inter-rocked with one another and voids interspersed therebetween, each of the composite secondary particles having originally a substantially globular form of a diameter of about 10 to about 150μ and comprising an amorphous silica particle in the form of a primary particle and extremely fine particles of calcium carbonate attached to the amorphous silica particle, the amorphous silica particle having a crystalline appearance, at least two surfaces in symmetric relation, a length of about 1 to about 500μ and a thickness of about 50 Å to about 1μ, the length being at least about 10 times the thickness.

The composite materials composed of the amorphous silica and extremely fine particles of calcium carbonate chemically or physically attached thereto find versatile applications for which Opsils are useful, because of their characteristics attributable to the Opsil contained therein. Further since the extremely fine particles of calcium carbonate are contained in the composite particles as attached to the Opsil, the composite particles are useful also as a filler. Moreover, the composite materials are useful as intermediate products for producing Opsil in various forms.

According to this invention, the composite material of amorphous silica and calcium carbonate resulting from carbonation is thereafter treated with an acid to remove the calcium carbonate from the amorphous silica. The acids to be used for this purpose include those having no reactivity with silica but being capable of decomposing calcium carbonate to produce carbon dioxide and a water-soluble salt. Examples thereof are hydrochloric acid, nitric acid, acetic acid, perchloric acid or the like. The acid treatment is carried out usually by immersing the composite material in a solution of the acid, or by introducing an acid gas such as hydrochloric acid gas into water in which the composite particles are immersed or dispersed. the acid is used in a stoichiometric amount or in excess. This treatment is preferably conducted at room temperatures, though elevated temperatures up to boiling points of the acid used are applicable. The reaction pressure is usually atmospheric pressure, but increased pressure is also applicable. Through the treatment, the calcium carbonate attached to the amorphous silica is decomposed with the acid to a water-soluble calcium salt, which is thereafter completely removed for example by washing with water, followed by drying, whereby primary particles, secondary particles or shaped body made up of amorphous silica are prepared. In the case of preparing shaped body, it can be treated with warm or hot water before drying, whereby linear shrinkage thereof due to drying can be lowered. The treatment can preferably be conducted by immersing the shaped body in hot water of higher than 60° C. for 0.5 to 10 hours. When hot water of higher than 100° C. is used, autoclave or the like closed vessel may be employed. The step of removing calcium carbonate produces no change in the configuration of the primary particles of amorphous silica. Accordingly, composite globular secondary particles of the composite material give globular secondary particles of amorphous silica, i.e. Opsil-II, retaining the original structure of the former, while shaped bodies of the composite material give shaped bodies of amorphous silica, i.e. Opsil-IS and Opsil-IIS, similarly retaining the original structure thereof. Further, the composite materials of amorphous silica and calcium carbonate in the form of primary particles and globular secondary particles have shapability similar to Opsil-I and Opsil-II. More specifically, the composite particles are easily dispersible in water and give shaped body having mechanical strength, when the slurry is shaped and dried. Therefore, Opsil-IS and Opsil-IIS can be prepared by shaping and drying the aqueous slurry of the composite particles to prepare shaped body thereof and subjecting the shaped body to the acid treatment as above, followed by washing with water and drying.

For a better understanding of this invention, Reference Examples and Examples of the invention are given below.

The accompanying drawings show x-ray diffraction patterns, electron micrographs, scanning electron micrographs and a pore size distribution diagram of the substances prepared in Examples and Reference Examples.

FIGS. 1(A) to (C) show x-ray diffraction patterns of a starting material, i.e. xonotlite crystals, composite particles of amorphous silica and calcium carbonate prepared from the crystals by carbonation, and Opsil-I of this invention respectively;

Figure 1:
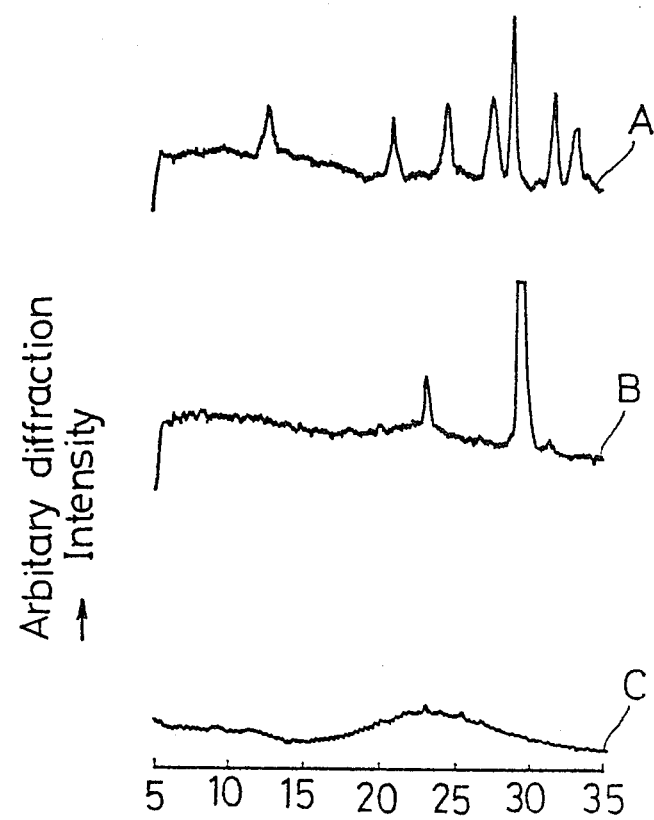

The x-ray diffraction patterns in FIGS. 1 are prepared using an x-ray diffractometer, irradiating the sample with x-rays of wavelength of 1.5405 Å emitted with a Cu target and measuring the diffraction angle and intensity. Three diffraction lines having the highest intensities are determined for the identification of the samples.

REFERENCE EXAMPLE 1

Quick lime is used as a lime material and minus 350 mesh siliceous sand powder (Tyler scale) as a siliceous material. The materials are dispersed in water in a CaO to $SiO_2$ mole ratio of 0.98:1 to prepare a slurry having a water to solids ratio by weight of 12:1. The slurry is placed in an autoclave and subjected to hydrothermal reaction at a temperature of 191° C. and a saturated vapor pressure of 12 kg/cm² with heating and stirring for 8 hours to obtain a slurry of xonotlite crystals.

The x-ray diffraction pattern of the xonotlite crystals in FIG. 1 (A) shows diffraction peaks (2θ) at 12.7°, 27.6° and 29.0° peculiar to xonotlite crystals. The analysis by ignition of the crystals reveals the following composition.

| $SiO_2$ | 48.88% |
|---|---|
| CaO | 45.60 |
| $Al_2O_3$ | 0.26 |
| $Fe_2O_3$ | 0.54 |
| Ig. loss | 4.51 |

| -continued | |
|---|---|
| Total | 99.80 |

Figure 5:
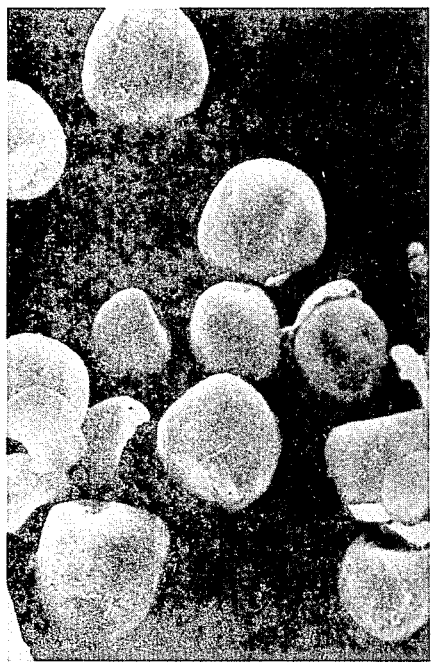
FIGS. 5 and 6 are scanning electron micrographs, in which FIGS. (A) show globular secondary particles composed of calcium silicate crystals used as starting materials, FIGS. (B) show globular secondary particles composed of composite materials of amorphous silica and calcium carbonate prepared by carbonating the crystals, and FIGS. (C) show Opsil-II of this invention.
Figure 5:
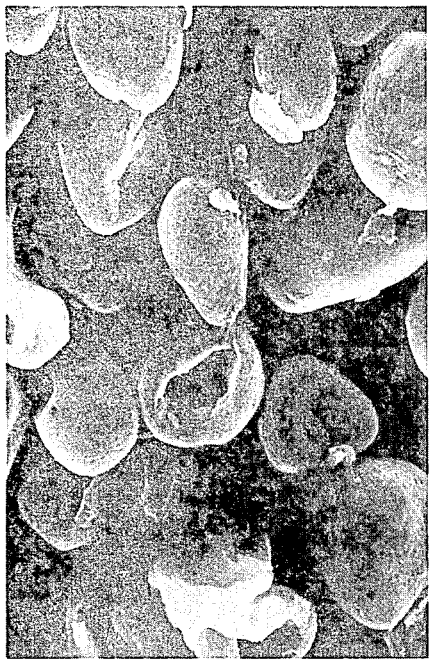
Figure 5:
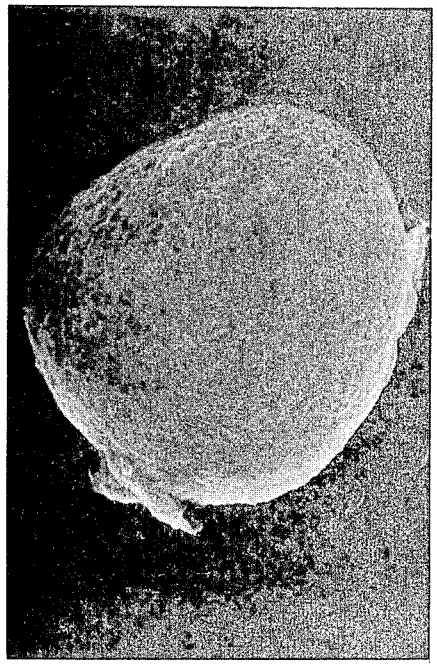

The slurry of xonotlite crystals is shown in the scanning electron micrograph of FIG. 5(A), which reveals that numerous lath-like xonotlite crystals are formed as randomly three-dimensionally interlocked with one another into many, substantially globular, secondary particle of xonotlite ranging from about 10 to about 60μ in diameter and suspended in water. The secondary particle has a porosity of about 95.6%.

Subsequently, the slurry containing the globular secondary particles of xonotlite is dried at 150° C. and then divided into primary particles.

Figure 2:
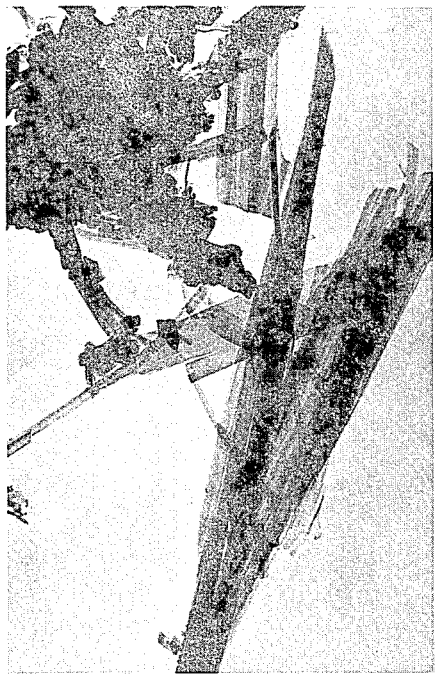
Figure 2:
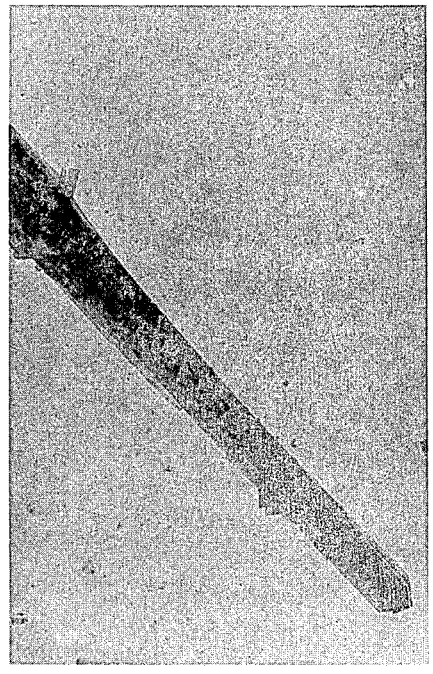
Figure 2:
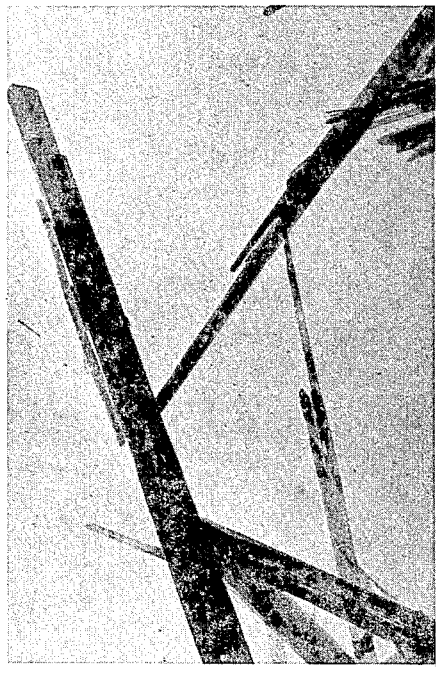

FIG. 2(A) shows an electron micrograph of the primary particles. The micrograph indicates that the primary particles have at least two surfaces in symmetric relation, a length of about 1 to about 20μ, a thickness of about 0.02 to about 0.1μ and a width of about 0.02 to about 1.0μ, the length being at least about 10 times the thickness. The primary particles have a specific surface area of about 50 m²/g.

Figure 7:
FIGS. 7 are scanning electron micrographs of fractured surfaces of shaped bodies at a magnification of 600×, in which (A) shows a shaped body of globular secondary particles of calcium silicate crystals used as starting materials, (B) shows a shaped body of globular secondary particles of composite material of amorphous silica and calcium carbonate and (C) shows a shaped body of Opsil-IIS.
Figure 7:
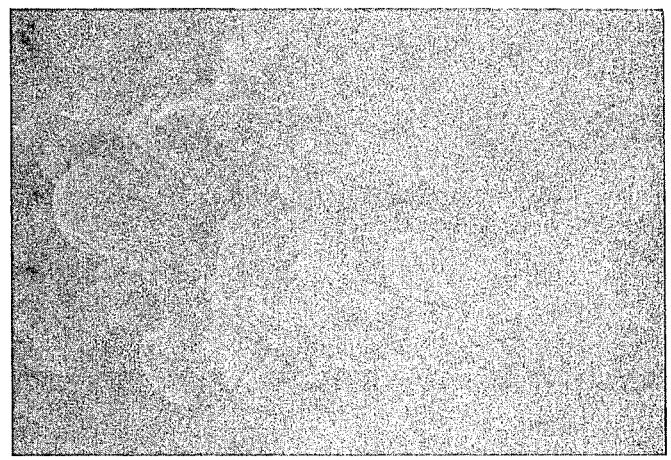
Figure 7:
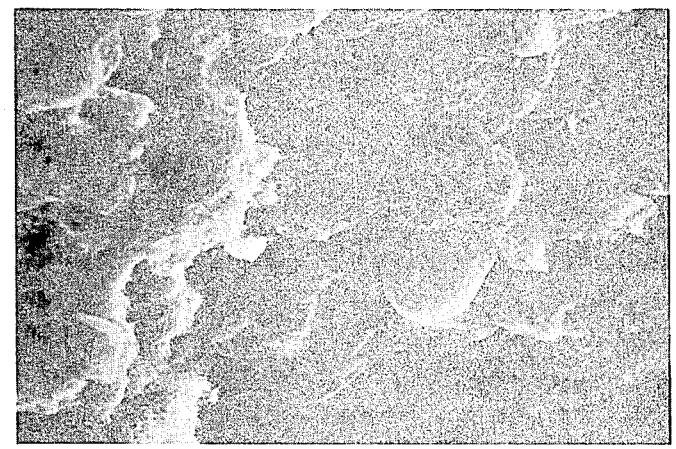

The slurry of xonotlite crystals prepared above is placed in a mold, 40 mm × 120 mm × 150 mm, and dewatered and shaped by a press and dried to obtain a shaped body. FIG. 7(A) is a scanning electron micrograph showing a fractured surface of the shaped body of xonotlite. The micrograph indicates that globular secondary particles of xonotlite are compressed and formed as interlocked with one another. The shaped body has a bulk density of 0.2 g/cm³, bending strength of about 4 kg/cm² and a porosity of about 92.7%.

REFERENCE EXAMPLE 2

Minus 325 mesh slaked lime (Tyler scale) is used as a lime material and minus 325 mesh siliceous sand powder (Tyler scale) as a siliceous material. The materials are dispersed in water in a CaO to $SiO_2$ mole ratio of 0.80:1 to prepare a slurry having a water to solids ratio of 12:1 by weight. The slurry is placed in an autoclave and subjected to hydrothermal reaction at a temperature of 191° C. and a saturated vapor pressure of 12 kg/cm² with heating and stirring for 5 hours to obtain a slurry of tobermorite crystals.

The x-ray diffraction of the tobermorite crystals shows diffraction peaks (2θ) at 7.8°, 29.0° and 30.0° peculiar to tobermorite crystals. The analysis by ignition of the crystals reveals the following composition.

| $SiO_2$ | 48.38% |
|---|---|
| CaO | 38.55 |
| $Al_2O_3$ | 0.31 |
| $Fe_2O_3$ | 0.45 |
| Ig. loss | 11.36 |
| Total | 99.05 |

Figure 6:
Figure 6:
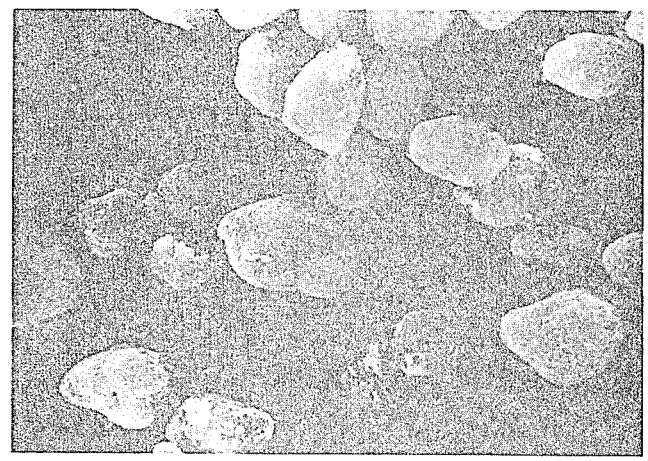
Figure 6:
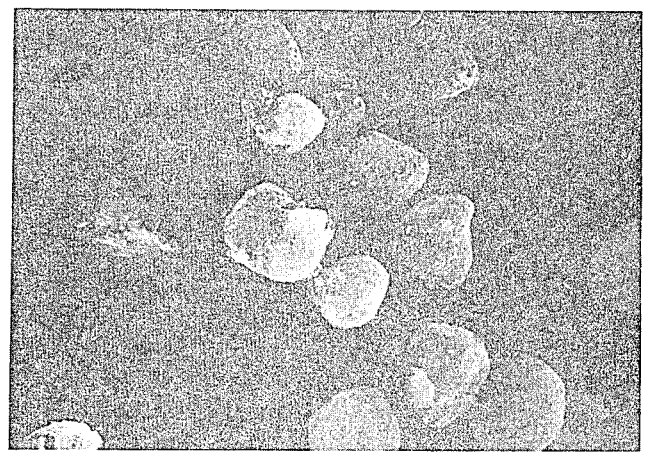

The slurry of tobermorite crystals is shown in the scanning electron micrograph of FIG. 6(A), which reveals that numerous plate-like tobermorite crystals are formed as randomly three-dimensionally interlocked with one another into many, substantially globular, secondary particles of tobermorite ranging from about 10 to about 60μ in diameter and suspended in water. The secondary particle has a porosity of about 94.0%.

Subsequently, the slurry containing the globular secondary particles of tobermorite is dried and then divided into primary particles.

Figure 3:
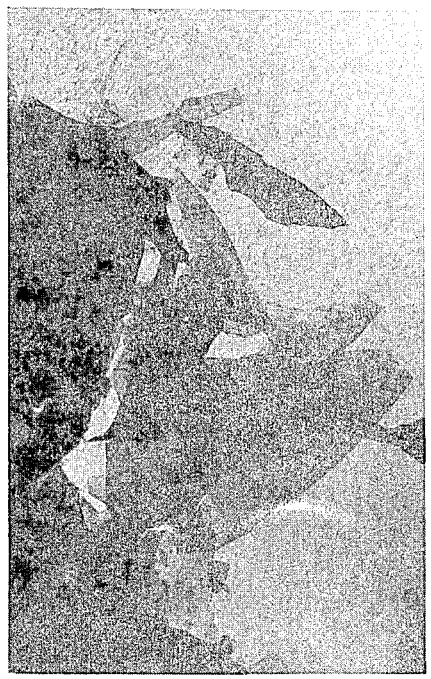
FIGS. 2 and 3 are electron micrographs at a magnification of 20,000×, in which FIGS. (A) show calcium silicate crystals used as starting materials, FIGS. (B) show composite materials of amorphous silica and calcium carbonate prepared by carbonating the crystals, and FIGS. (C) show the particles of Opsils-I obtained by treating the materials.

FIG. 3(A) shows an electron micrograph of the primary particles. The micrograph indicates that the primary particles have at least two surfaces in symmetric relation, a length of about 1 to about 20μ, a thickness of about 0.02 to about 0.1μ and a width of about 0.2 to about 5.0μ, the length being at least about 10 times the thickness. The primary particles have a specific surface area of about 61 m²/g.

The slurry of tobermorite crystals prepared above is placed in a mold, 40 mm × 120 mm × 150 mm, and dewatered and shaped by a press and dried to obtain a shaped body. The scanning electron micrograph showing a fractured surface of the shaped body of tobermorite resembles that of FIG. 7(A) and indicates that globular secondary particles of tobermorite are compressed and formed as interlocked with one another. The shaped body has a bulk density of 0.3 g/cm³, bending strength of about 12 kg/cm² and a porosity of about 88.0%.

REFERENCE EXAMPLE 3

Quick lime is used as a lime material and commercial white carbon having a particle size of less than 100μ and containing about 88 wt% of $SiO_2$ (Ig. loss about 12 wt%) as a siliceous material. The materials are dispersed in water in a CaO to $SiO_2$ mole ratio of 1.35:1 to prepare a slurry having a water to solids ratio of 12:1 by weight. The slurry is placed in an autoclave and subjected to hydrothermal reaction at a temperature of 191° C. and a saturated vapor pressure of 14 kg/cm² with heating and stirring for 3 hours to obtain a slurry of $CSH_n$ crystals.

The x-ray diffraction of the $CSH_n$ crystals shows diffraction peaks (2θ) at 29.4°, 31.8° and 49.8° peculiar to $CSH_n$ crystals. The analysis by ignition of the crystals reveals the following composition.

| | |
|---|---|
| $SiO_2$ | 38.19% |
| CaO | 47.78 |
| $Al_2O_3$ | 0.47 |
| $Fe_2O_3$ | 0.41 |
| Ig. loss | 13.04 |
| Total | 99.05 |

The slurry of $CSH_n$ crystals is observed under a scanning electron microscope with a similar result to those shown in FIGS. 5(A) and 6(A). It is found that numerous foil-like $CSH_n$ crystals are formed as randomly three-dimensionally interlocked with one another into many, substantially globular, secondary particles of $CSH_n$ ranging from about 10 to about 60μ in diameter and suspended in water. The secondary particle has a porosity of about 94.1%.

Subsequently, the slurry containing the globular secondary particles is dried and then divided into primary particles.

The electron micrograph of the primary particles indicates that the $CSH_n$ crystals are in the form of primary particles having a length of about 1 to about 5μ, a thickness of about 0.01 to about 0.02μ and a width of about 0.01 to about 5μ, the length being at least about 50 times the thickness. The primary particles have a specific surface area of about 150 m²/g.

The slurry of $CSH_n$ crystals prepared above is placed in a mold, 40 mm × 120 mm × 150 mm, and dewatered and shaped by a press and dried to obtain a shaped body. The scanning electron micrograph showing a fractured surface of the shaped body of $CSH_n$ resembles that of FIG. 7(A) and indicates that globular secondary particles of $CSH_n$ are compressed and formed as interlocked with one another. The shaped body has a bulk density of 0.3 g/cm³, bending strength of about 8 kg/cm² and a porosity of about 86.4%.

REFERENCE EXAMPLE 4

Quick lime is used as a lime material and commercial white carbon the same as in Reference Example 3 as a siliceous material. The materials are dispersed in water in a CaO to $SiO_2$ mole ratio of 0.57:1 to prepare a slurry having a water to solids ratio of 12:1 by weight. The slurry is placed in an autoclave and subjected to hydrothermal reaction at a temperature of 200° C. and a saturated vapor pressure of 15 kg/cm² with heating and stirring for 8 hours to obtain a slurry of gyrolite crystals.

The x-ray diffraction of the gyrolite crystals shows diffraction peaks at 4.0°, 28.2° and 28.9° peculiar to gyrolite crystals. The analysis by ignition of the crystals reveals the following composition.

| | |
|---|---|
| $SiO_2$ | 56.88% |
| CaO | 30.75 |
| $Al_2O_3$ | 0.39 |
| $Fe_2O_3$ | 0.29 |
| Ig. loss | 11.39 |
| Total | 99.70 |

The slurry of gyrolite crystals is observed under a scanning electron microscope with a similar result to those shown in FIGS. 5(A) and 6(A). It is found that numerous plate-like gyrolite crystals are formed as randomly three-dimensionally interlocked with one another into many, substantially globular, secondary particles of gyrolite ranging from about 10 to about 60μ in diameter and suspended in water. The secondary particle has a porosity of about 94.0%.

Subsequently, the slurry containing the globular secondary particles is dried and then divided into primary particles.

The electron micrograph of the primary particles indicates that the gyrolite crystals are in the form of primary particles having a length of about 1 to about 20μ, a thickness of about 0.02 to about 0.1μ and a width of about 0.2 to about 5μ, the length being at least about 10 times the thickness. The primary particles have a specific surface area of about 60 m²/g.

The slurry of gyrolite crystals prepared above is placed in a mold, 40 mm × 120 mm × 150 mm, and dewatered and shaped by a press and dried to obtain a shaped body. The scanning electron micrograph showing a fractured surface of the shaped body resembles that of FIG. 7(A) and indicates that secondary particles of gyrolite are compressed and formed as interlocked with one another. The shaped body has a bulk density of 0.3 g/cm³, bending strength of about 8 kg/cm² and a porosity of about 88.0%.

REFERENCE EXAMPLE 5

Quick lime is used as a lime material and minus 350 mesh siliceous sand powder (Tyler scale) as a siliceous material. The materials are dispersed in water in a CaO to $SiO_2$ mole ratio of 2.0:1 to prepare a slurry having a water to solids ratio of 4:1 by weight. The slurry is placed in an autoclave and subjected to hydrothermal reaction at a temperature of 191° C. and a saturated vapor pressure of 12 kg/cm² with heating for 5 hours to obtain a slurry of α-dicalcum silicate hydrate crystals.

The x-ray diffraction of the crystals shows diffraction peaks (2θ) at 16.6°, 27.3° and 37.2° peculiar to α-dalcium silicate hydrate crystals. The analysis by ignition of the crystals reveals the following composition.

| | |
|---|---|
| $SiO_2$ | 30.81% |
| CaO | 57.02 |
| $Al_2O_3$ | 0.45 |
| $Fe_2O_3$ | 0.50 |
| Ig. loss | 10.05 |
| Total | 99.05 |

The slurry of α-dicalcium silicate hydrate crystals is dried to obtain a fine white powder. FIG. 4(A) shows an electron micrograph of the powder at a magnification of 5,000×. The micrograph indicates that the α-dicalcium silicate hydrate crystals are in the form of plate-like primary particles having a length of about 1 to about 300μ, a thickness of about 0.1 to about 1μ and a width of 1 to 30μ, the length being at least about 10 times the thickness. The crystals have a specific surface area of about 6 m²/g.

EXAMPLE 1

The primary particles of lath-like xonotlite crystals obtained in Reference Example 1 are used as a starting material. The particles are placed in a pressure-resistant container of the closed type along with water 5 times the weight of the particles. Carbon dioxide gas is forced into the container at room temperature, and the particles are carbonated for about 30 minutes while maintaining the internal pressure at 3 kg/cm², whereby composite particles of amorphous silica and calcium carbonate are obtained.

The analysis by ignition of the composite particles reveals the following composition.

| | |
|---|---|
| $SiO_2$ | 36.04% |
| CaO | 33.54 |
| $Al_2O_3$ | 0.18 |
| $Fe_2O_3$ | 0.38 |
| Ig. loss | 28.87 |
| Total | 99.11 |

The x-ray diffraction of the particles shows the result given in FIG. 1(B), which indicates that all the peaks peculiar to calcium silicate crystals seen in FIG. 1(A) have disappeared and that only diffraction peaks (2θ) indicative of calcium carbonate crystals have appeared at 23.0°, 29.4° and 36.0°. This evidences that the calcium silicate has been converted to amorphous silica and calcium carbonate due to carbonation.

The composite particles are further observed under an electron microscope with the result given in FIG. 2(B). The microscopic observation reveals that the composite particles comprise amorphous silica particles and extremely fine particles, up to about 2μ in size, of calcium carbonate attached to the amorphous silica particles and that the particles of amorphous silica have at least two surfaces in symmetric relation, a length of about 1 to about 20μ, a thickness of about 0.02 to about 0.1μ and a width of about 0.02 to about 1.0μ, the length being at least about 10 times the thickness. The configuration of the amorphous silica particles is exactly the same as that of lath-like xonotlite crystals (FIG. 2(A)). This indicates that the amorphous silica particles retain the original lath-like configuration of xonotlite.

The composite particles are dispersed in water to a concentration of 5 wt. %, and the dispersion is allowed to stand after stirring for 20 minutes so as to separate the particles into the constituent silica and calcium carbonate by settling utilizing the difference in specific gravity. However, the two components are found to be entirely inseparable and proved to be firmly joined together chemically or physically.

Subsequently, the composite particles of amorphous silica and calcium cabonate are immersed in a 6 N HCl solution for one minute. With the evolution of carbon dioxide gas, the calcium carbonate in the primary particles is converted to carbon dioxide gas and calcium chloride. The acid-treated particles are then thoroughly washed with water to completely dissolve out the resulting calcium chloride. The particles are dried to obtain Opsil-I of this invention.

The Opsil-I thus prepared is subjected to ignition dehydration and thereafter to analysis. The result is given below which indicates that the product is composed of silica of high purity.

| | |
|---|---|
| $SiO_2$ | 99.1% |
| $Al_2O_3$ | 0.35 |
| CaO | <0.01 |
| (Ig. loss | 5.0) |

The x-ray diffraction pattern of Opsil-I is given in FIG. 1(C) which displays no peaks indicating the lath-like xonotlite crystals, the starting material, nor the peaks indicating the calcium carbonate contained in the composite particles resulting from the carbonation. It is therefore confirmed that the Opsil-I is amorphous silica.

The Opsil-I is shown in the electron micrograph of FIG. 2(C) which, exactly like FIGS. 2(A) and 2(B), reveals that the Opsil-I has a crystalline appearance and at least two surfaces in symmetric relation. The particles of Opsil-I are about 1 to about 20μ in length, about 0.02 to about 0.1μ in thickness and about 0.02 to about 1.0μ in width, the length being at least about 10 times the thickness and are in the form of primary particles. The appearance resembling lath-like crystals remains free of any change even when the particles are treated with acid.

The properties of the Opsil-I obtained above are as follows.

| | |
|---|---|
| Bulk density | 0.05 g/cm³ |
| Specific surface area | 335 m²/g |
| Oil adsorption | 800 cc/100 g |
| pH | 6.5 |

Figure 9:
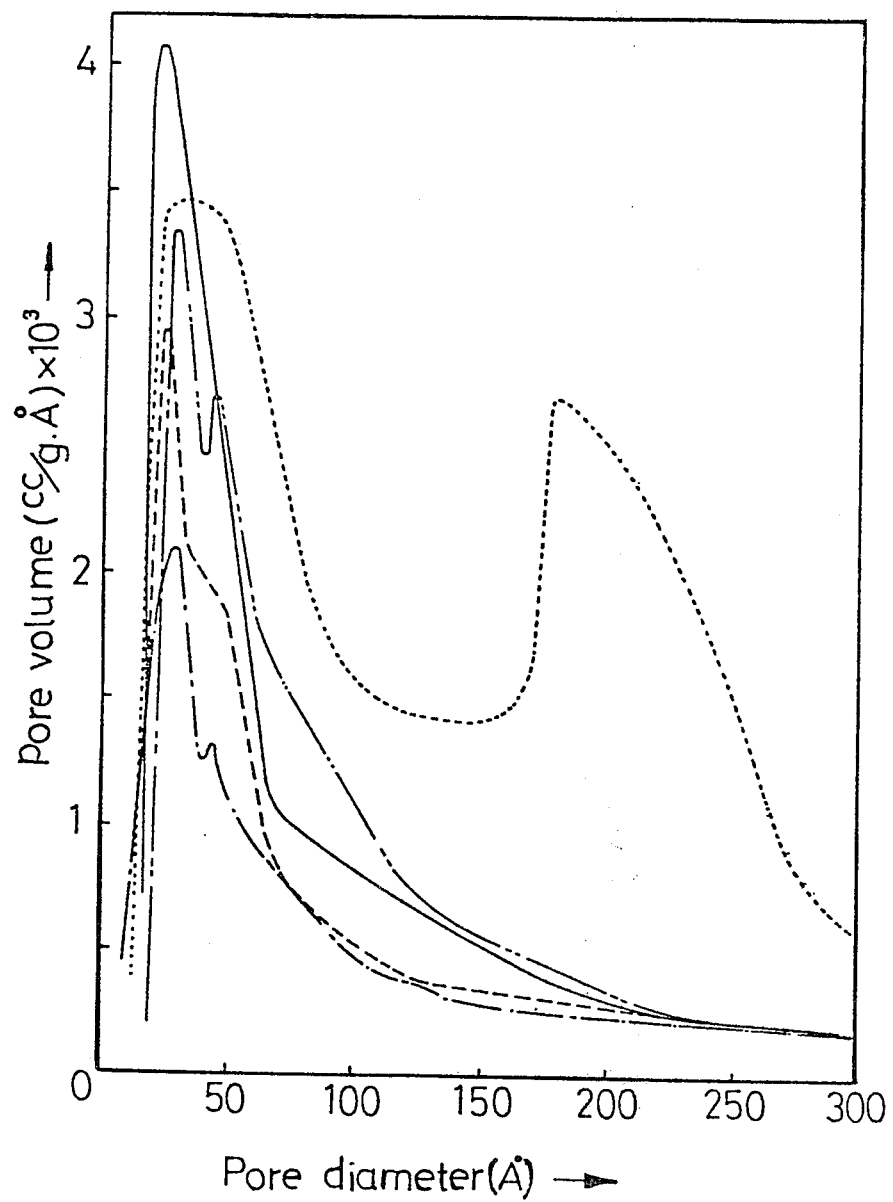
FIG. 9 is a pore size distribution diagram in which the pore size (Å) is plotted as abscissa and the pore volume (cc/Å.g×$10^3$) as ordinate.

The reference numeral (1) in FIG. 9 shows the pore size distribution of the Opsil-I with the peak at 27 Å.

EXAMPLE 2

The primary particles of plate-like tobermorite crystals obtained in Reference Example 2 are used as a starting material. The particles are placed in a pressure-resistant container of the closed type along with water 5 times the weight of the particles. Carbon dioxide gas is forced into the container at room temperature, and the particles are carbonated for about 30 minutes while maintaining the internal pressure at 3 kg/cm², whereby composite particles of amorphous silica and calcium carbonate are obtained.

The analysis by ignition of the composite particles reveals the following iginition composition.

| | |
|---|---|
| SiO₂ | 39.77% |
| CaO | 31.43 |
| Al₂O₃ | 0.24 |
| Fe₂O₃ | 0.40 |
| Ig. loss | 27.42 |
| Total | 99.26 |

The x-ray diffraction of the particles shows the same result as given in FIG. 1(B), which indicates that all the peaks peculiar to tobermorite crystals, the starting material, have disappeared and that only diffraction peaks ($2\theta$) indicative of calcium carbonate crystals have appeared at 23.0°, 24.8°, 27.0°, 29.4°, 32.8° and 36.0°. This evidences that the calcium silicate has been converted to amorphous silica and calcium carbonate due to carbonation.

Figure 3C:
Figure 3B:
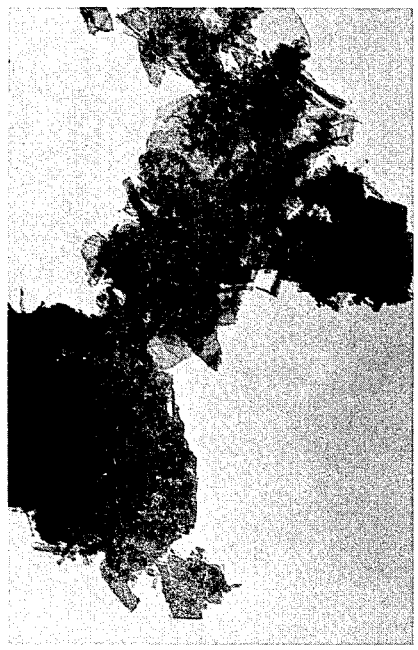

The composite particles are further observed under an electron microscope with the result given in FIG. 3(B). The microscopic observation reveals that the composite particles comprise amorphous silica particles and extremely fine particles, up to about $2\mu$ in size, of calcium carbonate attached to the amorphous silica particles and that the particles of amorphous silica have at least two surfaces in symmetric relation, a length of about 1 to about $20\mu$, a thickness of about 0.02 to about $0.1\mu$ and a width of about 0.2 to about $5.0\mu$, the length being at least about 10 times the thickness. The configuration of the amorphous silica particles is exactly the same as that of plate-like tobermorite crystals (FIG. 3(A)). This indicates that the amorphous silica particles retain the original plate-like configuration of tobermorite.

The composite particles are dispersed in water to a concentration of 5 wt. %, and the dispersion is allowed to stand after stirring for 20 minutes so as to separate the particles into the constituent silica and calcium carbonate by settling utilizing the difference in specific gravity. However, the two components are found to be entirely inseparable and proved to be firmly joined together chemically or physically.

Subsequently, the composite particles of amorphous silica and calcium carbonate are immersed in a 6 N HCl solution for one minute. With the evolution of carbon dioxide gas, the calcium carbonate in the primary particles is converted to carbon dioxide gas and calcium chloride. The acid-treated particles are then thoroughly washed with water to completely dissolve out the resulting calcium chloride. The particles are dried to obtain Opsil-I of this invention.

The Opsil-I thus prepared is subjected to ignition dehydration and thereafter to analysis. The result is given below which indicates that the product is composed of silica of high purity.

| | |
|---|---|
| SiO₂ | 99.3% |
| Al₂O₃ | 0.23 |
| CaO | <0.01 |
| (Ig. loss | 4.7) |

The x-ray diffraction pattern of Opsil-I is the same as in FIG. 1(C) which displays no peaks indicating the plate-like tobermorite crystals, the starting material, nor the peaks indicating the calcium carbonate contained in the composite particles resulting from the carbonation. The Opsil-I is amorphous silica.

The Opsil-I is shown in the electron micrograph of FIG. 3(C) which, exactly like FIGS. 3(A) and 3(B), reveals that the Opsil-I has a crystalline appearance and at least two surfaces in symmetric relation. The particles of Opsil-I are about 1 to $20\mu$ in length, about 0.02 to about $0.1\mu$ in thickness and about 0.2 to about $5.0\mu$ in width, the length being at least about 10 times the thickness and are in the form of primary particles. The crystalline appearance remains free of any change even when the particles are treated with acid.

The properties of the Opsil-I obtained above are as follows.

| | |
|---|---|
| Bulk density | 0.04 g/cm³ |
| Specific surface area | 277 n²/g |
| Oil adsorption | 750 cc/100 g |
| pH | 6.7 |

The reference numeral (2) in FIG. 9 shows the pore size distribution of the Opsil-I with the peak at 23 Å.

EXAMPLE 3

The primary particles of calcium silicate (CSHn) in the form of foil-like crystals obtained in Reference Example 3 are used as a starting material. The particles are placed in a pressure-resistant container of the closed type along with water 5 times the weight of the particles. Carbon dioxide gas is forced into the container at room temperature, and the particles are carbonated for about 30 minutes while maintaining the internal pressure at 3 kg/cm², whereby composite particles of amorphous silica and calcium carbonate are obtained.

The analysis by ignition of the composite particles reveals the following composition.

| | |
|---|---|
| SiO₂ | 29.98% |
| CaO | 37.59 |
| Al₂O₃ | 0.39 |
| Fe₂O₃ | 0.27 |
| Ig. loss | 31.28 |
| Total | 99.51 |

The x-ray diffraction of the particles shows the same result as given in FIG. 1(B), which indicates that all the peaks peculiar to CSHn crystals, the starting material, have disappeared and that only diffraction peaks ($2\theta$) indicative of calcium carbonate crystals have appeared at 23.0°, 24.8°, 27.0°, 29.4°, 32.8° and 36.0°. This evidences that the calcium silicate has been converted to amorphous silica and calcium carbonate due to carbonation.

The composite particles are further observed under an electron microscope with the result that the composite particles comprise amorphous silica particles and extremely fine particles, up to about $2\mu$ in size, of calcium carbonate attached to the amorphous silica particles and that the particles of amorphous silica have at least two surfaces in symmetric relation, a length of about 1 to about $5\mu$, a thickness of about 0.01 to about $0.02\mu$ and a width of about 0.01 to about $5.0\mu$, the length being at least about 50 times the thickness. The configuration of the amorphous silica particles is exactly the same as that of foil-like CSHn crystals. This indicates that the amorphous silica particles retain the original foil-like configuration of CSHn.

The composite particles are dispersed in water to a concentration of 5 wt. %, and the dispersion is allowed to stand after stirring for 20 minutes so as to separate the particles into the constituent silica and calcium carbonate by settling utilizing the difference in specific gravity. However, the two components are found to be entirely inseparable and proved to be firmly joined together chemically or physically.

Subsequently, the composite particles of amorphous silica and calcium carbonate are immersed in a 6 N HCl solution for one minute. With the evolution of carbon dioxide gas, the calcium carbonate in the primary particles is converted to carbon dioxide gas and calcium chloride. The acid-treated particles are then throughly pushed with water to completely dissolve out the resulting calcium chloride. The particles are dried to obtain Opsil-I of this invention.

The Opsil-I thus prepared is subjected to ignition dehydration and thereafter to analysis. The result is given below which indicates that the product is composed of silica of high purity.

| | |
|---|---|
| $SiO_2$ | 99.7% |
| $Al_2O_3$ | 0.03 |
| CaO | <0.01 |
| (Ig. loss | 3.1) |

The x-ray diffraction pattern of Opsil-I is the same as in FIG. 1(a) which displays no peaks indicating the foil-like CSHn crystals, the starting material, nor the peaks indicating the calcium carbonate contained in the composite particles resulting from the carbonation. The Opsil-I is amorphous silica.

Observation of electron micrograph reveals that the Opsil-I has a crystalline appearance and at least two surfaces in symmetric relation. The particles of Opsil-I are about 1 to about $5\mu$ in length, about 0.01 to about 0.02g in thickness and about 0.01 to about $5.0\mu$ in width, the length being at least about 50 times the thickness and are in the form of primary particles. The crystalline appearance remains free of any change even when the particles are treated with acid.

The properties of the Opsil-I obtained above are as follows.

| | |
|---|---|
| Bulk density | 0.07 g/cm$^3$ |
| Specific surface area | 461 m$^2$/g |
| Oil absorption | 470 cc/100 g |
| pH | 6.5 |

The reference numeral (3) in FIG. 9 shows the pore size distribution of the Opsil-I with the peak at about 30 Å and about 180 Å.

EXAMPLE 4

The primary particles of plate-like gyrolite crystals obtained in Reference Example 4 are used as a starting material. The particles are placed in a pressure-resistant container of the closed type along with water 5 times the weight of the particles. Carbon dioxide gas is forced into the container at room temperature, and the particles are carbonated for about 30 minutes while maintaining the internal pressure at 3 kg/cm$^2$, whereby composite particles of amorphous silica and calcium carbonate are obtained.

The analysis by ignition of the composite particles reveals the following composition.

| | |
|---|---|
| $SiO_2$ | 48.22% |
| CaO | 26.07 |
| $Al_2O_3$ | 0.33 |
| $Fe_2O_3$ | 0.25 |
| Ig. loss | 24.33 |
| Total | 99.20 |

The x-ray diffraction of the particles shows the same result as given in FIG. 1(B), which indicates that all the peaks peculiar to calcium silicate crystals, the starting material, have disappeared and that only diffraction peaks (2θ) indicative of calcium carbonate crystals have appeared at 23.0°, 24.8°, 27.0°, 29.4°, 32.8° and 36.0°.

This evidences that the calcium silicate has been converted to amorphous silica and calcium carbonate due to carbonation.

The composite particles are further observed under an electron microscope with the result that the composite particles comprise amorphous silica particles and extremely fine particles, up to about $2\mu$ in size, of calcium carbonate attached to the amorphous silica particles and that the particles of amorphous silica have at least two surfaces in symmetric relation, a length of about 1 to about $20\mu$, a thickness of about 0.02 to about $0.1\mu$ and a width of about 0.2 to about $5\mu$, the length being at least about 10 times the thickness. The configuration of the amorphous silica particles is exactly the same as that of plate-like gyrolite crystals. This indicates that the amorphous silica particles retain the original plate-like configuration of gyrolite.

The composite particles are dispersed in water to a concentration of 5 wt. %, and the dispersion is allowed to stand after stirring for 20 minutes so as to separate the particles into the constituent silica and calcium carbonate by settling utilizing the difference in specific gravity. However, the two components are found to be entirely inseparable and proved to be firmly joined together chemically or physically.

Subsequently, the composite particles of amorphous silica and calcium carbonate are immersed in a 6 N HCl solution for one minute. With the evolution of carbon dioxide gas, the calcium carbonate in the primary particles is converted to carbon dioxide gas and calcium dioxide. The acid-treated particles are then thoroughly washed with water to completely dissolve out the resulting calcium chloride. The particles are dried to obtain Opsil-I of this invention.

The Opsil-I thus prepared is subjected to ignition dehydration and thereafter to analysis. The result is given below which indicates that the product is composed of silica of high purity.

| | |
|---|---|
| $SiO_2$ | 99.4% |
| $Al_2O_3$ | 0.09 |
| CaO | <0.01 |
| (Ig. loss | 5.8) |

The x-ray diffraction pattern of Opsil-I is the same as in FIG. 1(C) which displays no peaks indicating the plate-like gyrolite crystals, the starting material, nor the peaks indicating the calcium carbonate contained in the composite particles resulting from the carbonation. The Opsil-I is amorphous silica.

Observation of electron micrograph reveals that the Opsil-I has a crystalline appearance and at least two surfaces in symmetric relation. The particles of Opsil-I are about 1 to about $20\mu$ in length, about 0.02 to about $0.1\mu$ in thickness and about 0.2 to about $5\mu$ in width, the length being at least about 10 times the thickness and are in the form of primary particles. The crystalline appearance remains free of any change even when the particles are treated with acid.

The properties of the Opsil-I obtained above are as follows.

| | |
|---|---|
| Bulk density | 0.065 g/cm$^3$ |
| Specific surface area | 285 n$^2$/g |
| Oil adsorption | 530 cc/100 g |
| pH | 6.3 |

The reference numeral (4) in FIG. 9 shows the pore size distribution of pore diameters of the Opsil-I with the peak at 22 Å.

EXAMPLE 5

The primary particles of plate-like α-dicalcium silicate hydrate crystals obtained in Reference Example 5 are used as a starting material. The particles are placed in a pressure-resistant container of the closed type along with water 5 times the weight of the particles. Carbon dioxide gas is forced into the container at room temperature, and the particles are carbonated for about 30 minutes while maintaining the internal pressure at 3 kg/cm$^2$, whereby composite particles of amorphous silica and calcium carbonate are obtained.

The analysis by ignition of the composite particles reveals the following composition.

| | |
|---|---|
| SiO$_2$ | 22.86 |
| CaO | 42.24 |
| Al$_2$O$_3$ | 0.31 |
| Fe$_2$O$_3$ | 0.33 |
| Ig. loss | 34.50 |
| Total | 100.24 |

The x-ray diffraction of the particles shows the same result as given in FIG. 1(B), which indicates that all the peaks peculiar to calcium silicate crystals, the starting material, have disappeared and that only diffraction peaks (2θ) indicative of calcium carbonate crystals have appeared at 23.0°, 24.8°, 27.0°, 29.4°, 32.8° and 36.0°. This evidences that the calcium silicate has been converted to amorphous silica and calcium carbonate due to carbonation.

The composite particles are further observed under an electron microscope with the result that the composite particles comprise amorphous silica particles and extremely fine particles, up to about 2μ in size, of calcium carbonate attached to the amorphous silica particles and that the particles of amorphous silica have at least two surfaces in symmetric relation, a length of about 1 to about 300μ, a thickness of about 0.1 to about 1μ and a width of about 1 to about 30μ, the length being at least about 10 times the thickness. The configuration of the amorphous silica particles is exactly the same at that of plate-like α-dicalcium silicate hydrate crystals (FIG. 4(A)). This indicates that the amorphous silica particles retain the original plate-like configuration of the crystals.

The composite particles are dispersed in water to a concentration of 5 wt. %, and the dispersion is allowed to stand after stirring for 20 minutes so as to separate the particles into the constituent silica and calcium carbonate by settling utilizing the difference in specific gravity. However, the two components are found to be entirely inseparable and proved to be firmly joined together chemically or physically.

Subsequently, the composite particles of amorphous silica and calcium carbonate are immersed in a 6 N HCl solution for one minute. With the evolution of carbon dioxide gas, the calcium carbonate in the primary particles is converted to carbon dioxide gas and calcium chloride. The acid-treated particles are then thoroughly washed with water to completely dissolve out the resulting calcium chloride. The particles are dried to obtain Opsil-I of this invention.

The Opsil-I thus prepared is subjected to ignition dehydration and thereafter to analysis. The result is given below which indicates that the product is composed of silica of high purity.

SiO$_2$—99.6%
Al$_2$O$_3$—0.12
Cao—<0.01
(Ig. loss—5.2)

The x-ray diffraction pattern of Opsil-I is the same as in FIG. 1(C) which displays no peaks indicating the plate-like α-dicalcium silicate crystals, the starting material, nor the peaks indicating the calcium carbonate contained in the composite particles resulting from the carbonation. The Opsil-I is amorphous silica.

Figure 4B:
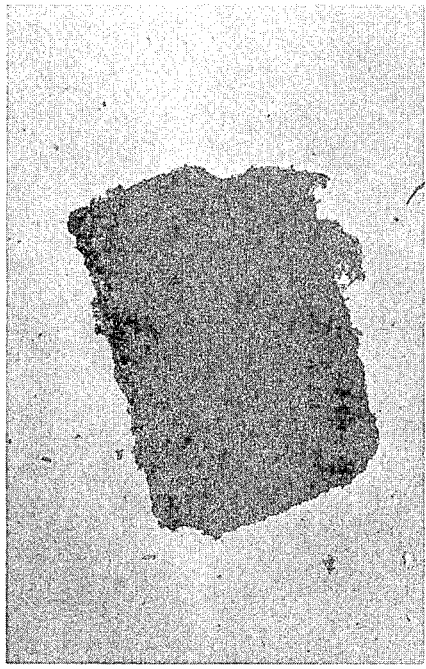
FIGS. 4 are electron micrographs at a magnification of 5,000× in which FIG. (A) shows α-dicalcium silicate hydrate crystals used as a starting material, and FIG. (B) shows Opsil-I prepared from the crystals.
Figure 4A:
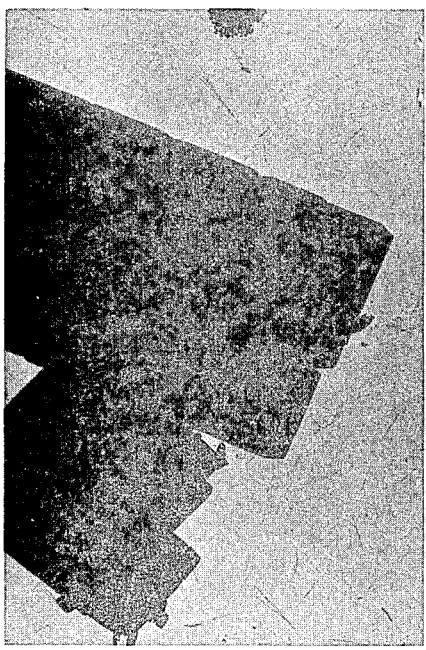

The Opsil-I is shown in the electron micrograph of FIG. 4(B) which reveals that the Opsil-I has a crystalline appearance and at least two surfaces in symmetric relation. The particles of Opsil-I are about 1 to about 300μ in length, about 0.1 to about 1μ in thickness and about 1 to about 30μ in width, the length being at least about 10. times the thickness and are in the form of primary particles. The crystalline appearance remains free of any change even when the particles are treated with acid.

The properties of the Opsil-I obtained above are as follows.

Bulk density—0.15 g/cm$^3$
Specific surface area—550 m$^2$/g
Oil adsorption—340 cc/100 g
pH—7.1

The reference numeral (5) in FIG. 9 shows the pore size distribution of the Opsil-I with the peak at 24 Å.

EXAMPLE 6

The slurry of xonotlite crystals obtained in Reference Example 1 is dewatered to solids (xonotlite crystals) ratio by weight of 5:1 and is then placed in a closed container. Carbon dioxide gas is forced into the container to maintain an internal pressure of 3 kg/cm$^2$, and the slurry is reacted for about 30 minutes.

The reaction gives composite secondary particles of amorphous silica and calcium carbonate.

The analysis of the secondary particles reveals that they have the same composition as the primary particles constituting them.

The x-ray diffraction of the particles further reveals the same result as given in FIG. 1(B), indicating that the peaks due to the calcium silicate crystals prior to the carbonation have all disappeared but showing only the diffraction peaks (2θ) of calcium carbonate at 21.0°, 29.4° and 36.0°. This evidences that the composite secondary particles are composed of amorphous silica and calcium carbonate.

The composite secondary particles are further observed under a scanning electron microscope at a magnification of 600× with the result given in FIG. 5(B), which shows that the composite secondary particles are formed from numerous composite primary particles interlocked with one another substantially into globules ranging from about 10 to about 60μ in diameter. The electron microscope of the primary particles derived from the above secondary particles gives the same result as in FIG. 2(B).

This structure or form substantially conforms to that of secondary particles of xonotlite used as the starting material and shown in FIG. 5(A). This indicates that the composite particles retain the original structure or nature of the secondary particles of xonotlite despite the carbonation.

The composite secondary particles are dispersed in water to a concentration of 5 wt.%, and the dispersion is allowed to stand after stirring for 20 minutes. However, the particles are found inseparable by settling into their components, namely amorphous silica and calcium carbonate.

Subsequently, the composite secondary particles are immersed in a 6 N HCl solution for one minute. Simultaneously with the immersion, carbon dioxide gas evolves due to the conversion of the calcium carbonate in the primary particles to calcium chloride. The particles are then thoroughly washed with water to completely dissolve out the resulting calcium chloride. The particles are dried to give Opsil-II of this invention.

The x-ray diffraction of the Opsil-II thus prepared exhibits the same result as in FIG. 1(C), showing that the peaks due to calcium silicate crystals and those due to calcium carbonate have all disappeared. Thus the Opsil-II is found to be composed of amorphous silica.

The Opsil-II is observed under a scanning electron microscope at a magnification of 2,000× with the result given in FIG. 5(C), which indicates that the particles of Opsil-II have substantially the same shape as the secondary particles of xonotlite and also as the composite secondary particles of amorphous silica and calcium carbonate which retain the original structure of the former particles.

The Opsil-II prepared as above is readily dispersible in water to give a slurry which in itself is shapable. The Opsil-II has the following properties.

Bulk density—0.04 g/cm$^3$
Specific surface area—400 m$^2$/g
Specific surface area after heating at 400° C.—350 m$^2$/g
Porosity—98%
Heat resistance—No deformation at 950° C.
Oil adsorption:—1,100 cc/100 g
Chemical analysis:
SiO$_2$ content—99.1%

EXAMPLE 7

The slurry of tobermorite crystals obtained in Reference Example 2 is dewatered to a water to solids (tobermorite crystals) ratio by weight of 5:1 and is then placed in a closed container. Carbon dioxide gas is forced into the container to maintain an internal pressure of 3 kg/cm$^2$, and the slurry is reacted for about 30 minutes.

The reaction gives composite secondary particles of amorphous silica and calcium carbonate.

The analysis of the secondary particles reveals that they have the same composition as the primary particles constituting them.

The x-ray diffraction of the particles further reveals that the peaks due to the calcium silicate crystals prior to the carbonation have all disappeared but showing only the diffraction peaks (2θ) of calcium carbonate at 23.0°, 24.8°, 27.0°, 29.4°, 32.8° and 36.0°. This evidences that the composite secondary particles are composed of amorphous silica and calcium carbonate.

The composite secondary particles are further observed under a scanning electron microscope at a magnification of 600× with the result given in FIG. 6(B), which shows that the composite secondary particles are formed from numerous composite primary particles interlocked with one another substantially into globules ranging from about 10 to about 60μ in diameter. The electron microscope of the primary particles derived from the above secondary particles gives the same result as in FIG. 3(B).

This structure or form substantially conforms to that of secondary particles of tobermorite used as the starting material and shown in FIG. 6(A). This indicates that the composite particles retain the original structure or nature of the secondary particles of xonotlite despite the carbonation.

The composite secondary particles are dispersed in water to a concentration of 5 wt.%, and the dispersion is allowed to stand after stirring for 20 minutes. However, the particles are found inseparable by settling into their components, namely amorphous silica and calcium carbonate.

Subsequently, the composite secondary particles are immersed in a 6 N HCl solution for one minute. Simultaneously with the immersion, carbon dioxide gas evolves due to the conversion of the calcium carbonate in the primary particles to calcium chloride. The particles are then thoroughly washed with water to completely dissolve out the resulting calcium chloride. The particles are dried to give Opsil-II of this invention.

The x-ray diffraction of the Opsil-II thus prepared shows that the peaks due to calcium silicate crystals and those due to calcium carbonate have all disappeared. Thus the Opsil-II is found to be composed of amorphous silica.

The Opsil-II is observed under a scanning electron microscope at a magnification of 600× with the result given in FIG. 6(C), which indicates that the particles of Opsil-II have substantially the same shape as the secondary particles of tobermorite and also as the composite secondary particles of amorphous silica and calcium carbonate which retain the original structure of the former particles.

The Opsil-II prepared as above is readily dispersible in water to give a slurry which in itself is shapable. The Opsil-II has the following properties.

Bulk density—0.04 g/cm$^3$
Specific surface area—430 m$^2$/g
Specific surface area after heating at 400° C.—380 m$^2$/g
Porosity—98%
Heat resistance—No deformation at 950° C.
Oil adsorption—980 cc/100 g
Chemical analysis:
SiO$_2$ content—99.3%

EXAMPLE 8

The slurry of calcium silicate (CSHn) crystals obtained in Reference Example 3 is dewatered to a water to solids (CSHn crystals) ratio by weight of 5:1 and is then placed in a closed container. Carbon dioxide gas is forced into the container to maintain an internal pressure of 3 kg/cm$^2$, and the slurry is reacted for about 30 minutes.

The reaction gives composite secondary particles of amorphous silica and calcium carbonate.

The analysis of the secondary particles reveals that they have the same composition as the primary particles constituting them.

The x-ray diffraction of the particles further reveals that the peaks due to the calcium silicate crystals prior to the carbonation have all disappeared but showing only the diffraction peaks (2θ) of calcium carbonate at 23.0°, 24.8°, 27.0°, 29.4°, 32.8° and 36.0°. This evidences that the composite secondary particles are composed of amorphous silica and calcium carbonate.

The composite secondary particles are further observed under a scanning electron microscope with the same result as those given in FIGS. 5(B) and 6(B), showing that the composite secondary particles are formed from numerous composite primary particles interlocked with one another substantially into globules ranging from about 10 to about 60μ in diameter. The electron microscope of the primary particles derived from the above secondary particles gives the same result as obtained by that of composite primary particles prepared in Example 3.

This structure or form substantially conforms to that of secondary particles of CSHn used as the starting material. This indicates that the composite particles retain the original structure or nature of the secondary particles despite the carbonation.

The composite secondary particles are dispersed in water to a concentration of 5 wt.%, and the dispersion is allowed to stand after stirring for 20 minutes. However, the particles are found inseparable by settling into their components, namely amorphous silica and calcium carbonate.

Subsequently, the composite secondary particles are immersed in a 6 N HCl solution for one minute. Simultaneously with the immersion, carbon dioxide gas evolves due to the conversion of the calcium carbonate in the primary particles to calcium chloride. The particles are then thoroughly washed with water to completely dissolve out the resulting calcium chloride. The particles are dried to give Opsil-II of this invention.

The x-ray diffraction of the Opsil-II thus prepared shows that the peaks due to calcium silicate crystals and those due to calcium carbonate have all disappeared. Thus the Opsil-II is found to be composed of amorphous silica.

The Opsil-II is observed under a scanning electron microscope with the same result as those given in FIGS. 5(C) and 6(C), which indicates that the particles of Opsil-II have substantially the same shape as the secondary particles of CSHn and also as the composite secondary particles of amorphous silica and calcium carbonate which retain the original structure of the former particles.

The Opsil-II prepared as above is readily dispersible in water to give a slurry which in itself is shapable. The Opsil-II has the following properties.

| | |
|---|---|
| Bulk density | 0.08 g/cm$^3$ |
| Specific surface area | 550 m$^2$/g |
| Specific surface area after heating at 400° C. | 480 m$^2$/g |
| Porosity | 96% |
| Heat resistance | No deformation at 950° C. |
| Oil adsorption | 750 cc/100 g |
| Chemical analysis: | |
| SiO$_2$ content | 99.7% |

EXAMPLE 9

The secondary particles of xonotlite crystals obtained in Reference Example 1 are baked at 1,000° C. for one hour into β-wollactonite crystals, and the crystals are placed, in a water to solids (β-wollastonite crystals) ratio by weight of 5:1, in a closed container. Carbon dioxide gas is forced into the container to maintain an internal pressure of 3 kg/cm$^2$, and the slurry is reacted for about 30 minutes.

The reaction gives composite secondary particles of amorphous silica and calcium carbonate.

The analysis of the secondary particles reveals the following composition.

| | |
|---|---|
| SiO$_2$ | 36.00% |

| -continued | |
|---|---|
| CaO | 33.58% |
| Al$_2$O$_3$ | 0.15 |
| Fe$_2$O$_3$ | 0.35% |
| Ig. loss | 28.92% |
| Total | 99/0% |

The x-ray diffraction of the particles further reveals that the peaks due to the calcium silicate crystals prior to the carbonation have all disappeared but showing only the diffraction peaks (2θ) of calcium carbonate at 23.0°, 24.8°, 27.0°, 29.4°, 32.8° and 36.0°. This evidences that the composite secondary particles are composed of amorphous silica and calcium carbonate.

The composite secondary particles are further observed under a scanning electron microscope with the same result as those given in FIGS. 5(B) and 6(B), showing that the composite secondary particles are formed from numerous composite primary particles interlocked with one another substantially into globules ranging from about 10 to about 60μ in diameter. By the electron microscope the primary particles derived from the above secondary particles are found to be formed of amorphous silica particles having the original configuration of the starting β-wollastonite crystals and extremely fine particles of calcium carbonate attached thereto.

This structure or form substantially conforms to that of secondary particles of β-wollastonite used as the starting material. This indicates that the composite particles retain the original structure or nature of the secondary particles of β-wollastonite despite the carbonation.

The composite secondary particles are disposed in water to a concentration of 5 wt.%, and the dispersion is allowed to stand after stirring for 20 minutes. However, the particles are found inseparable by settling into their components, namely amorphous silica and calcium carbonate.

Subsequently, the composite secondary particles are immersed in a 6 N HCl solution for one minute. Simultaneously with the immersion, carbon dioxide gas evolves due to the conversion of the calcium carbonate in the primary particles to calcium chloride. The particles are then thoroughly washed with water to completely dissolve out the resulting calcium chloride. The particles are dried to give Opsil-II of this invention.

The x-ray diffraction of the Opsil-II thus prepared shows that the peaks due to calcium silicate crystals are those due to calcium carbonate have all disappeared. Thus the Opsil-II is found to be composed of amorphous silica.

The Opsil-II is observed under a scanning electron microscope with the same result as those given in FIGS. 5(C) and 6(C), which indicates that the particles of Opsil-II have substantially the same shape as the secondary particles of β-wollastonite and also as the composite secondary particles of amorphous silica and calcium carbonate which retain the original structure of the former particles.

The Opsil-II prepared as above is readily dispersible in water to give a slurry which in itself is shapable.

The analysis reveals the Opsil-II has revealed the following result which indicates that the product is composed of silica of high purity.

| | |
|---|---|
| SiO | 99.4% |
| Al$_2$O$_3$ | 0.25% |

| | |
|---|---|
| CaO | <0.01% |
| (Ig. loss | 5.0%) |

The properties of the Opsil-II are as follows.

| | |
|---|---|
| Bulk density | 0.04 g/cm$^3$ |
| Specific surface area | 280 m$^2$/g |
| Specific surface area after heating at 400° C. | 230 m$^2$/g |
| Porosity | 98% |
| Heat resistance | No deformation at 950° C. |
| Oil adsorption | 780 cc/100 g |

EXAMPLE 10

The xonotlite shaped body (bulk density: 0.2 g/cm$^3$) obtained in Reference Example 1 is placed with water, in a water to solids ratio by weight of 2:1, in a closed container. Carbon dioxide gas is forced into the container to maintain an internal pressure of 3 kg/cm$^2$ for about 30 minutes for carbonation.

The reaction, followed by drying, gives a composite shaped body of amorphous silica and calcium carbonate.

A fractured surface of the shaped body is observed under a scanning electron microscope with the result given in FIG. 7(B), which shows that the shaped body has exactly the same structure as the starting material, i.e. xonotlite shaped body (FIG. 7(A)). It is found that the shaped body is formed from globular secondary particles which are compressed and interlocked with one another and firmly into an integral mass, the composite body thus retaining the original structure of the starting material intact. Furthermore, the primary particles forming the secondary particles are found to have the same form as shown in FIG. 2(B) by electron microscopic observation and have the same diffraction peaks as shown in FIG. 1(B) according to x-ray diffraction. Thus the product is a composite shaped body made up of needle-like particles of amorphous silica and extremely fine particles of calcium carbonate attached thereto.

Subsequently, the composite shaped body is immersed in a 6 N HCl solution for one minute. Simultaneously with the immersion, carbon dioxide gas evolves and the calcium carbonate in the shaped body is converted to calcium chloride. The shaped body is then thoroughly washed with water to completely dissolve but the resulting calcium chloride and is thereafter dried to give Opsil-IIS of this invention.

X-ray diffraction confirms that the Opsil-IIS, like Opsil-I and Opsil-II, is amorphous.

Observation under a scanning electron microscope gives the result shown in FIG. 7(C), indicating that in structure the Opsil-IIS substantially resembles the starting material, namely xonotlite shaped body (FIG. 7(A)), and the composite shaped body obtained by carbonating the material (FIG. 7(B)). The substantially globular particles of Opsil-II, ranging from about 10 to about 60μ in diameter, are compressed and interlocked with one another, forming the integral body of the Opsil-IIS.

The Opsil-IIS prepared as above has the following properties.

| | |
|---|---|
| Bulk density | 0.09 g/cm$^2$ |
| Specific surface area | 288 m$^2$/g |
| Compression strength | 6 kg/cm$^2$ |
| Porosity | 95% |

The Opsil-IIS prepared as above, when fired in an electric oven at 1000° C. for 1 hour, gives a contraction of about 12%, but no changes are observed in the compressed globular form of Opsil-II constituting the shaped body. The properties of the fired product are as follows.

| | |
|---|---|
| Bulk density | 0.085 g/cm$^2$ |
| Compression Strength | 10 kg/cm$^2$ |
| Porosity | 95% |

The fired product has a thermal expansion coefficient of $5.7 \times 10^{-7}$/°C. and exhibits substantially no expansion and contraction in repeated heating tests conducted at 950° C.

Further, Opsil-IIS having a bulk density of 0.3 g/cm$^2$ in prepared in the same manner as above except that a shaped body of xonotlite crystals having a bulk density of 0.62 g/cm$^3$, which is prepared in the same manner as in Reference Example 1 with increased shaping pressure, is employed as a starting material. The Opsil-IIS is cut along a plane vertical to the direction of the shaping pressure. The scanning electron micrograph of the cut surface indicates that the Opsil-II constituting the shaped body has been compressed with the lath-like Opsil-I particles oriented in a direction vertical to the direction of the pressure applied. This structure is the same as that of the starting xonotlite shaped body. The properties of Opsil-IIS are as follows:

| | |
|---|---|
| Bulk density | 0.3 g/cm$^3$ |
| Specific surface area | 290 m$^2$/g |
| Compression strength | 15 kg/cm$^2$ |
| Porosity | 85% |

EXAMPLE 11

The tobermorite shaped body (bulk density: 0.3 g/cm$^3$) obtained in Reference Example 2 is placed with water, in a water to solids ratio by weight of 2:1, in a closed container. Carbon dioxide gas is forced into the container to maintain an internal pressure of 3 kg/cm$^2$ for about 30 minutes for carbonation.

The reaction, followed by drying, gives a composite shaped body of amorphous silica and calcium carbonate.

A fractured surface of the shaped body is observed under a scanning electron microscope with the same result as given in FIG. 7(B), which shows that the shaped body has exactly the same structure as the starting material, i.e. tobermorite shaped body. It is found that the shaped body is formed from globular secondary particles which are compressed and interlocked with one another and firmly into an integral mass, the composite body thus retaining the original structure of the starting material intact. Furthermore, the primary particles forming the secondary particles are found to have the same form as shown in FIG. 3(B) by electron microscopic observation and have the same diffraction peaks peculiar to calcium carbonate according to x-ray diffraction. Thus the product is a composite shaped body made up of plate-like particles of amorphous silica and extremely fine particles of calcium carbonate attached thereto.

Subsequently, the composite shaped body is immersed in a 6 N HCl solution for one minute. Simultaneously with the immersion, carbon dioxide gas evolves and the calcium carbonate in the shaped body is converted to calcium chloride. The shaped body is then thoroughly washed with water to completely dissolve out the resulting calcium chloride and is thereafter dried to give Opsil-IIS of this invention.

X-ray diffraction confirms that the Opsil-IIS, like Opsil-I and Opsil-II, is amorphous.

Observation under a scanning electron microscope gives the same result as shown in FIG. 7(C), indicating that in structure the Opsil-IIS substantially resembles the starting material, namely tobermorite shaped body and the composite shaped body obtained by carbonating the material. The substantially globular particles of Opsil-II, ranging from about 10 to about 60$\mu$ in diameter, are compressed and interlocked with one another forming the integral body of the Opsil-IIS.

The Opsil-IIS prepared as above has the following properties.

| | |
|---|---|
| Bulk density | 0.13 g/cm$^2$ |
| Specific surface area | 277 m$^2$/g |
| Compression strength | 4 kg/cm$^2$ |
| Porosity | 93% |

EXAMPLE 12

The shaped body (bulk density: 0.3 g/cm$^3$) of calcium silicate (CSH$_n$) obtained in Reference Example 3 is placed with water in a water to solids ratio by weight of 2:1, in a closed container. Carbon dioxide gas is forced into the container to maintain an internal pressure of 3 kg/cm$^2$ for about 30 minutes for carbonation.

The reaction, followed by drying, gives a composite shaped body of amorphous silica and calcium carbonate.

A fractured surface of the shaped body is observed under a scanning electron microscope with the same result as given in FIG. 7(B), which shows that the composite shaped body has exactly the same structure as the starting material, i.e. CSH$_n$ shaped body. It is found that the shaped body is formed form globular secondary particles which are compressed and interlocked with one another and firmly into an integral mass, the composite body thus retaining the original structure of the starting material intact. Furthermore, the primary particles forming the secondary particles are found to have the same form as foil-like particle peculiar to CSH$_n$ by electron microscopic observation and have the same diffraction peaks peculiar to calcium carbonate according to x-ray diffraction. Thus the product is a composite shaped body made up of foil-like particles of amophous silica and extremely fine particles of calcium carbonate attached thereto.

Subsequently, the composite shaped body is immersed in a 6 N HCl solution for one minute. Simultaneously with the immersion, carbon dioxide gas evolves and the calcium carbonate in the shaped body is converted to calcium chloride. The shaped body is then thoroughly washed with water to completely dissolve out the resulting calcium chloride and is thereafter dried to give Opsil-IIS of this invention.

X-ray diffraction confirms that the Opsil-IIS, like Opsil-I and Opsil-II, is amorphous.

Observation under a scanning electron microscope gives the same result as shown in FIG. 7(C), indicating that in structure the Opsil-IIS substantially resembles the starting material, namely CSH$_n$ shaped body and the composite shaped body obtained by carbonating the material. The substantially globular particles of Opsil-II, ranging from about 10 to about 60$\mu$, are compared and interlocked with one another, forming the integral body of the Opsil-IIS.

The Opsil-IIS prepared as above has the following properties.

| | |
|---|---|
| Bulk density | 0.14 g/cm$^2$ |
| Specific surface area | 461 m$^2$/g |
| Compression strength | 4 kg/cm$^2$ |
| Porosity | 92% |

EXAMPLE 13

The powder of Opsil-II (100 wt. parts) obtained in Example 6 and 2 wt. parts of glass fibers are dispersed in water, to a water to solids ratio by weight of 10:1, to prepare a slurry. The slurry is placed in a mold, 40 mm × 120 mm × 150 mm, and then dewatered by a press. The shaped mass is removed from the mold and dried at 105° C. for 24 hours to obtain a shaped body of this invention, i.e. Opsil-IIS, having the following properties.

| | |
|---|---|
| Bulk density | 0.11 g/cm$^3$ |
| Bending strength | 6 kg/cm$^2$ |
| Compression strength | 9 kg/cm$^2$ |
| Porosity | 93% |

EXAMPLE 14

The Opsil-II obtained in Example 7 is shaped in the same manner as in Example 13 to prepare a shaped body of this invention, i.e. Opsil-IIS, having the following properties.

| | |
|---|---|
| Bulk density | 0.15 g/cm$^3$ |
| Bending strength | 4.5 kg/cm$^2$ |
| Compression strength | 7 kg/cm$^2$ |
| Porosity | 91% |

EXAMPLE 15

The Opsil-II obtained in Example 8 is shaped in the same manner as in Example 13 to prepare an Opsil-IIS of this invention having the following properties.

| | |
|---|---|
| Bulk density | 0.21 g/cm$^3$ |
| Bending strength | 2.3 kg/cm$^2$ |
| Compression strength | 4 kg/cm$^2$ |
| Porosity | 88% |

EXAMPLE 16

The composite secondary particles of amorphous silica and calcium carbonate obtained by the first step of Example 6 are disposed in water, to a water to solids ratio by weight of 10:1. The resulting slurry is placed in a mold, 40 mm × 120 mm × 150 mm, and dewatered and shaped by a press to prepare a composite shaped body of amorphous silica and calcium carbonate. The shaped body has the same structure as the composite shaped body described in Example 10.

In the same manner as in Example 10, the shaped body is immersed in a 6 N HCl solution for acid treatment, then washed with water to completely dissolve out the calcium chloride formed and thereafter dried to obtain an Opsil-IIS of this invention.

The Opsil-IIS has substantially the same structure and form as the Opsil-IIS obtained in Example 10. The properties of the Opsil-IIS are as follows.

| | |
|---|---|
| Bulk density | 0.13 g/cm$^3$ |
| Bending strength | 5 kg/cm$^2$ |
| Compression strength | 10 kg/cm$^2$ |
| Porosity | 92% |

EXAMPLE 17

The Opsil-I obtained in Example 1 is dispersed in water in a water to solids ratio by weight of 5:1. The mixture is placed in a mold, dewatered and shaped by a press with varying shaping pressures, followed by drying. The physical properties of the shaped body (Opsil-IS) thus obtained are as follows.

| | Sample No. | | |
|---|---|---|---|
| | 1 | 2 | 3 |
| Bulk density (g/cm$^3$) | 0.15 | 0.38 | 0.95 |
| Bending strength | | | |

|  | Sample No. | | |
|---|---|---|---|
|  | 1 | 2 | 3 |
| (kg/cm²) | 4.2 | 18.0 | 43.2 |
| Compression Strength (kg/cm²) | 7.3 | 23.5 | 61.0 |
| Porosity (%) | 92.5 | 81.0 | 52.5 |
| Specific surface area (m²/g) | 340 | 338 | 330 |

EXAMPLE 18

The Opsil-I obtained in Example 2 is dispersed in water in a water to solids ratio by weight of 5:1. The mixture is placed in a mold, dewatered and shaped by a press with varying shaping pressures, followed by drying. The physical properties of the shaped body (Opsil-IS) thus obtained are as follows.

|  | Sample No. | |
|---|---|---|
|  | 1 | 2 |
| Bulk density (g/cm³) | 0.13 | 0.50 |
| Bending strength (kg/cm²) | 4.0 | 25 |
| Compression strength (kg/cm²) | 5.2 | 35 |
| Porosity (%) | 93.5 | 75.0 |
| Specific surface area (m²/g) | 280 | 268 |

EXAMPLE 19

Quick lime and siliceous sand powder in a CaO to SiO₂ mole ratio of 0.98:1 are dispersed in water to prepare a slurry having a water to solids ratio by weight of 5:1. The slurry is swollen with stirring at 100° C. for 5 hours, then press-molded and thereafter subjected in an autoclave to hydrothermal reaction at 15 kg/cm² at 200° C. for 10 hours to obtain a shaped body with a bulk density of 0.35 g/cm³.

The x-ray diffraction of the shaped body reveals the diffraction peaks ($2\theta$) peculiar to xonotlite crystals at 12.7°, 27.6° and 29.0°. Elementary analysis also confirms that the shaped body is composed of xonotlite crystals. When a fractured surface of the shaped body is observed under an electron microscope, it is ascertained that the body is formed from numerous needle-like xonotlite crystals randomly three-dimensionally interlocked with one another to an integral mass.

In the same manner as in Example 10, the shaped body of xonotlite is placed, in a water to solids ratio by weight of 2:1, in a closed container. Carbon dioxide gas is forced into the container at an internal pressure of 3 kg/cm² for about 30 minutes.

The x-ray diffraction of the resulting shaped body shows exactly the same result as given in FIG. 1(B), revealing the diffraction peaks due to calcium carbonate. Observation under an electron microscope further shows that the shaped body retains the original structure of xonotlite shaped body used as the starting material. Thus the product is identified as a composite shaped body of amorphous silica and calcium carbonate which comprises amorphous silica having the original configuration of the xonotlite crystals and extremely fine particles of calcium carbonate attached thereto.

In the same manner as in Example 10, the composite shaped body is immersed in a 6 N HCl solution for one minute, then thoroughly washed with water to completely dissolve out the resulting calcium chloride and thereafter dried, whereby an Opsil-IS of this invention is obtained.

Figure 8:
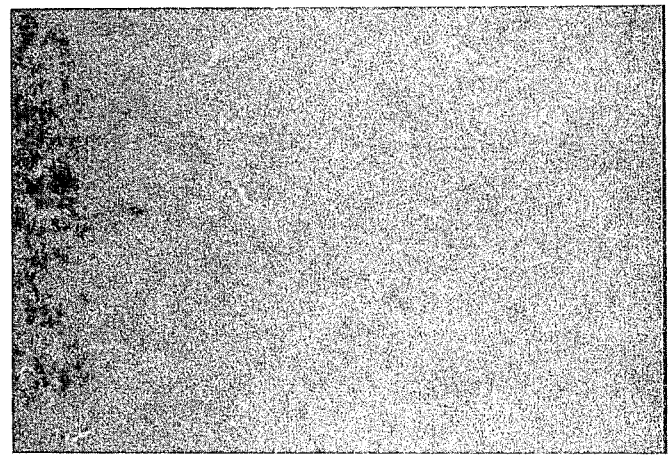
FIG. 8 is a scanning electron micrograph at a magnification of 1,000× showing Opsil-IS of this invention.

The x-ray diffraction of the Opsil-IS shown the same result as given in FIG. 1(C), indicating no diffraction peaks. The analysis of the product further reveals that the SiO₂ content is not lower than 99%, indicating that the Opsil-IS is composed of amorphous silica of high purity. The scanning electron micrograph of FIG. 8, showing a fractured surface of the Opsil-IS at a magnification of 1,000×, indicates that in structure the Opsil-IS is substantially indentical to the starting material, i.e. xonotlite shaped body, and to the composite shaped body of amorphous silica and calcium carbonate obtained by carbonating the material. More specifically, the product is formed from the particles of amorphous silica (Opsil-I) which are randomly three-dimensionally interlocked with one another into an integral mass and which have at least two surfaces in symmetric relation, a length of about 1 to about 20μ, a thickness of about 0.02 to about 0.1μ and a width of about 0.02 to about 1.0μ, the length being at least about 10 times the thickness.

The Opsil-IS has the following properties.
Bulk density                            0.20 g/cm³
Specific surface area               251 m²/g
Compression strength            5 kg/cm²
Porosity                                   90%

EXAMPLE 20

Commercial autoclave light-weight concrete containing about 80 wt.% of tobermorite and about 20 wt.% of quartz and having a bulk density of 0.63 g/cm³ is immersed in water for 1 hour and placed in a closed vessel. The concrete is subjected to carbonation and acid treatment in the same manner as in Example 10, followed by drying, to obtain shaped body of the invention. X-ray diffraction shows only the diffraction peaks ($2\theta$) of quartz at 26.7° and 20.8°. This evidences that the tobermerite is converted to amorphous silica. The analysis shows the product contains SiO₂ in a purity of not lower than 98%. The shaped body is cut along planes vertical and parallel to the direction of the shaping pressure. The scanning electron micrographs of the cut surfaces indicate that the shaped body is formed of numerous plate-like amorphous silica particles randomly three-dimensionally interlocked with one another and substantially circular pores of a diameter of less than 1 mm. The properties of the shaped body are as follows.
Bulk density                            0.30 g/cm³
Specific surface area               301 m²/g
Compression strength            12 kg/cm²
Porosity                                   85%

What we claim is:

1. An amorphous silica particle in the form of a substantially globular secondary particle having a diameter of about 10 to about 150μ, a surface area of 250–600 m²/g and an oil absorption of 500–1200 cc/100 g, and composed of numerous primary particles of amorphous silica randomly three-dimensionally interlocked with one another and voids interspersed therebetween;

(a) each of the primary particles having a crystalline appearance of calcium silicate crystal and at least two surfaces in symmetric relation, and having:
        (i) a length of about 1 to about 50μ and a thickness of about 100 Å to about 0.5μ, the length being about 10 to about 5,000 times the thickness when the calcium silicate crystal is xonotlite crystal, tobermorite crystal or gyrolite crystal, or
(ii) a length of about 1 to about 20μ and a thickness of about 50 to about 500 Å, the length being about 50 to about 5,000 times the thickness when the calcium silicate crystal is CSHn crystal,
(b) the calcium silicate crystal being one member selected from the group consisting of xonotlite crystals, tobermolite crystals, gyrolite crystals and CSHn crystals; and (c) the primary particle containing at least 98% by weight of $SiO_2$ when dehydrated by ignition and chemically analyzed.

2. An amorphous silica particle as defined in claim 1 wherein the porosity is at least about 75%.

3. An amorphous silica particle as defined in claim 1, wherein said primary particles have a surface area of 250–600 $m^2/g$ and an oil absorption of 300–900 cc/100 g.

* * * * *